(12) United States Patent
Terasawa et al.

(10) Patent No.: US 6,690,418 B1
(45) Date of Patent: Feb. 10, 2004

(54) IMAGE SENSING APPARATUS IMAGE SIGNAL CONTROLLER AND METHOD

(75) Inventors: Ken Terasawa, Yokohama (JP); Yuichiro Hattori, Yokohama (JP)

(73) Assignee: Canon Kabushiki Kaisha (JP)

( * ) Notice: Subject to any disclaimer, the term of this patent is extended or adjusted under 35 U.S.C. 154(b) by 177 days.

(21) Appl. No.: 08/771,399

(22) Filed: Dec. 19, 1996

(30) Foreign Application Priority Data

Dec. 26, 1995 (JP) .............................. 7-339258
Jan. 12, 1996 (JP) .............................. 8-003602

(51) Int. Cl.⁷ .............................. H04N 9/68
(52) U.S. Cl. .............................. 348/235; 348/237
(58) Field of Search .............................. 348/235, 237, 348/321, 283

(56) References Cited

U.S. PATENT DOCUMENTS

| | | | | |
|---|---|---|---|---|
| 4,339,771 A | * | 7/1982 | Morishita et al. ............ 348/237 |
| 4,621,286 A | * | 11/1986 | Reitmeier et al. ........... 348/436 |
| 4,714,955 A | * | 12/1987 | Nishimura et al. .......... 348/237 |
| 4,903,122 A | * | 2/1990 | Ozaki et al. ................. 348/237 |
| 5,189,511 A | * | 2/1993 | Parulski et al. ............. 358/518 |
| 5,737,015 A | * | 4/1998 | Juen ........................... 348/321 |

* cited by examiner

Primary Examiner—Wendy R. Garber
Assistant Examiner—Luong Nguyen
(74) Attorney, Agent, or Firm—Morgan & Finnegan

(57) ABSTRACT

Two image signals from a non-interlace scanning type CCD at predetermined horizontal and vertical sampling frequencies are respectively inputted to automatic gain controllers, then to a color separator where the input signals are separated into luminance signal and color difference signals. The luminance signal is processed by a two-dimensional filter which traps frequency components having ½ of the horizontal and vertical sampling frequencies. Accordingly, a variation in amplification characteristics of the automatic gain controllers is compensated as a variation of luminance signals having Nyquist frequencies in the horizontal and vertical directions. Thereby, bad effect due to variations in amplification characteristics of the automatic gain controllers is reduced even through two output signals from the non-interlace scanning type CCD are processed by the respective automatic gain controllers.

18 Claims, 27 Drawing Sheets

FIG. 7A

|   |   |   |   |
|---|---|---|---|
|   | G" |   | G" |
| G |   | G |   |
|   | G" |   | G" |
| G |   | G |   |

FIG. 7B

| G* | G" | G* | G" |
| G  | G* | G  | G* |
| G* | G" | G* | G" |
| G  | G* | G  | G* |

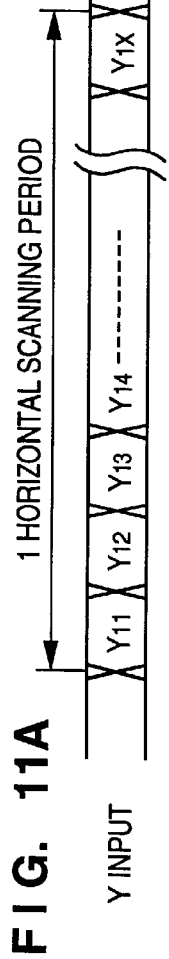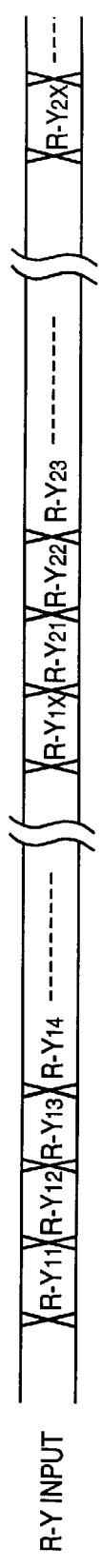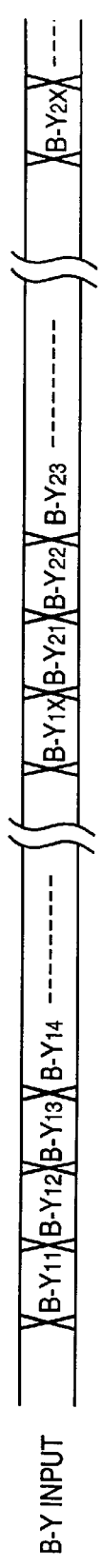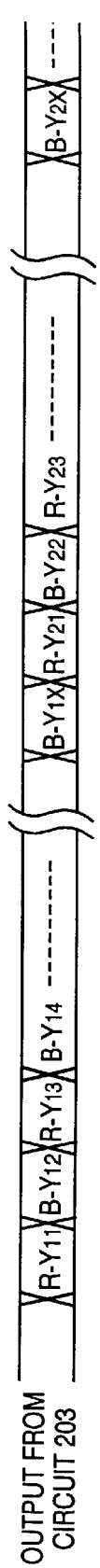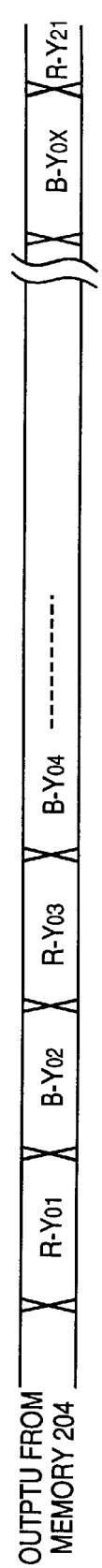
FIG. 11A  Y INPUT
FIG. 11B  OUTPUT FROM MEMORY 201
FIG. 11C  R-Y INPUT
FIG. 11D  B-Y INPUT
FIG. 11E  OUTPUT FROM CIRCUIT 203
FIG. 11F  OUTPUT FROM MEMORY 204

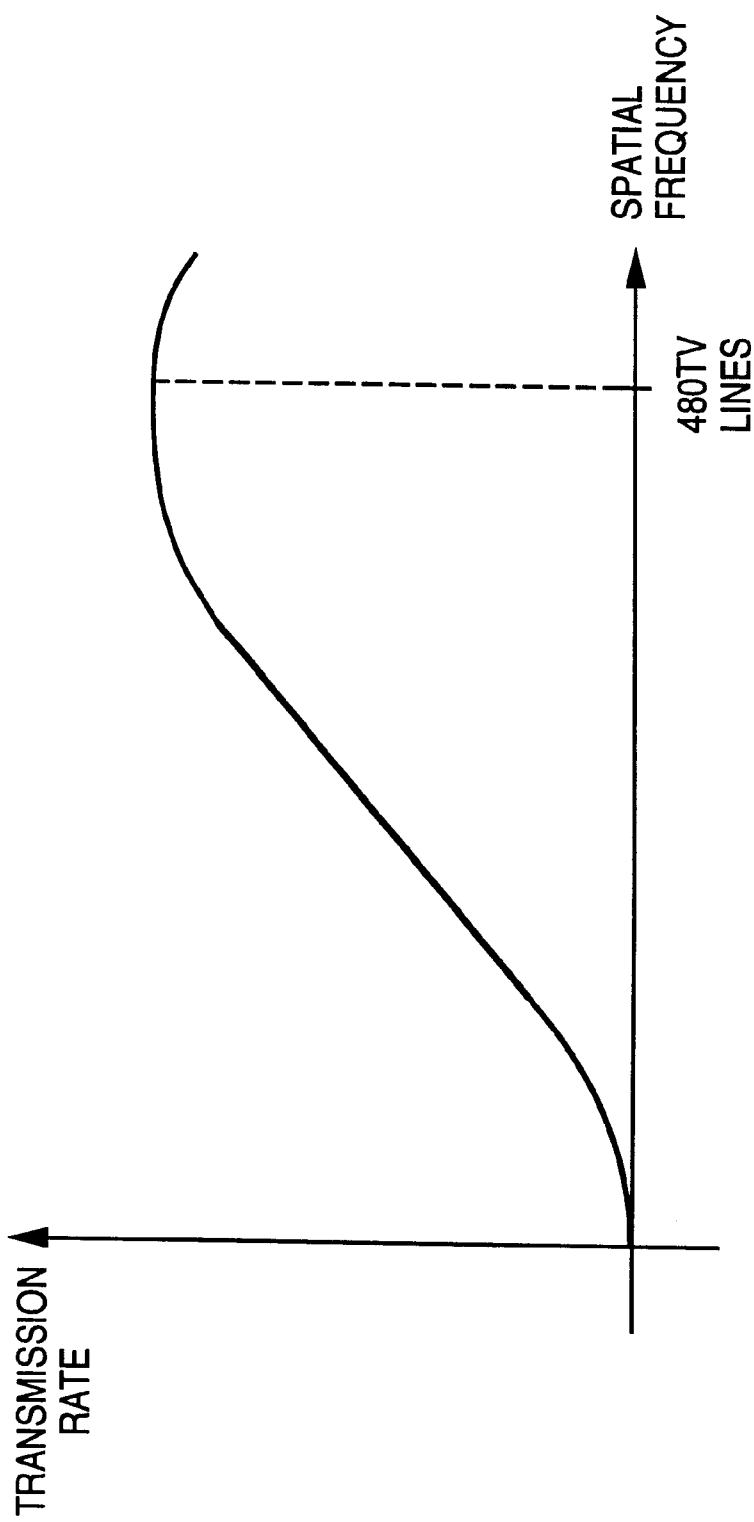

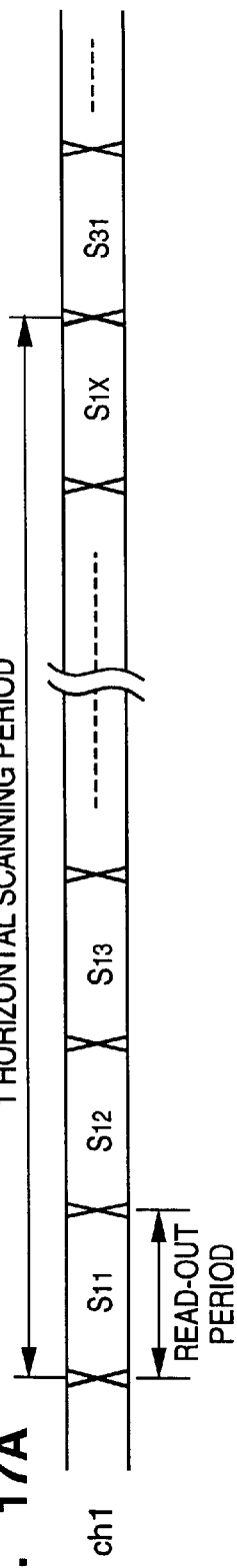
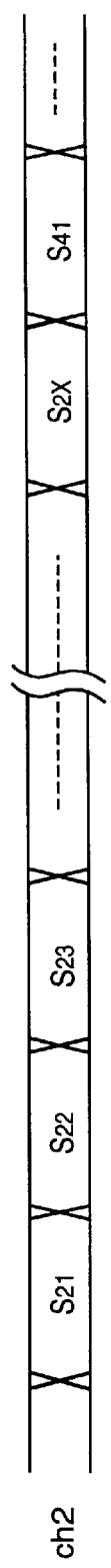
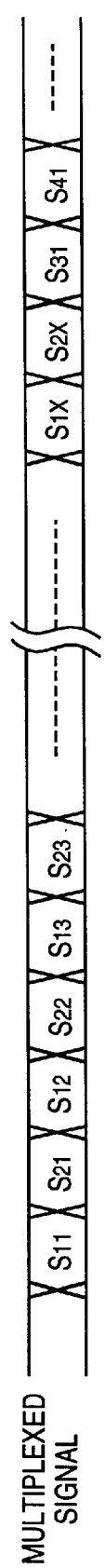
FIG. 17A
FIG. 17B
FIG. 17C

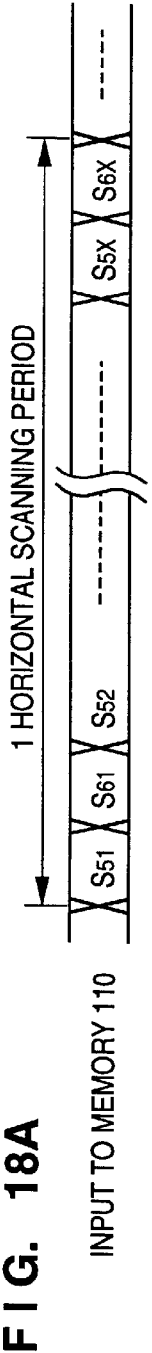
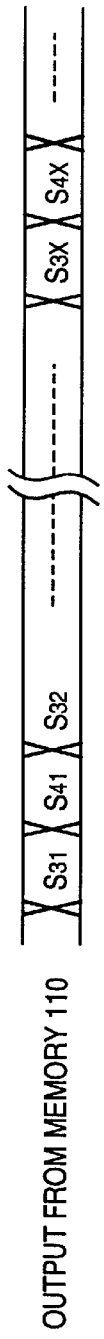
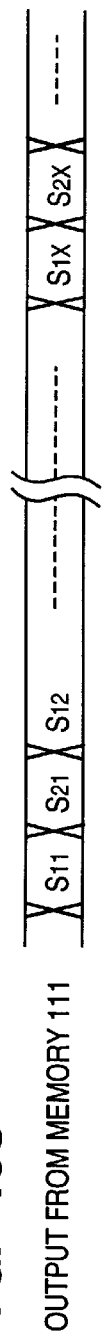
FIG. 18A INPUT TO MEMORY 110
FIG. 18B OUTPUT FROM MEMORY 110
FIG. 18C OUTPUT FROM MEMORY 111
FIG. 18D

FIG. 21A

MULTIPLEXED SIGNAL Y: $Y_{11}$ | $Y_{21}$ | $Y_{12}$ | $Y_{22}$ | $Y_{13}$ | $Y_{23}$ | $Y_{14}$ | $Y_{24}$ | ----

FIG. 21B

MULTIPLEXED SIGNAL R-Y: $R-Y_{11}$ | $R-Y_{21}$ | $R-Y_{12}$ | $R-Y_{22}$ | $R-Y_{13}$ | $R-Y_{23}$ | $R-Y_{14}$ | $R-Y_{24}$ | ----

FIG. 21C

MULTIPLEXED SIGNAL B-Y: $B-Y_{11}$ | $B-Y_{21}$ | $B-Y_{12}$ | $B-Y_{22}$ | $B-Y_{13}$ | $B-Y_{23}$ | $B-Y_{14}$ | $B-Y_{24}$ | ----

Y/C1: SIGNALS OF ODD SCAN LINES | SIGNALS OF EVEN SCAN LINES
(1 FIELD PERIOD)

FIG. 21G

Y/C2: SIGNALS OF EVEN SCAN LINES | SIGNALS OF ODD SCAN LINES

| line 1 | R | G | R | G |
| --- | --- | --- | --- | --- |
| line 2 | G | B | G | B |
| line 3 | R | G | R | G |
| line 4 | G | B | G | B |

IMAGE SENSING APPARATUS IMAGE SIGNAL CONTROLLER AND METHOD

BACKGROUND OF THE INVENTION

The present invention relates to an image sensing apparatus suitable for using a sequential scanning type solid-state image sensing device having a color filter of so-called Bayer arrangement, and the like.

Recently, an image sensing device, such as CCD, capable of sequentially reading signals of all the pixels (referred as "non-interlace scanning type image sensing device", hereinafter) has been developed with the progress of semiconductor manufacturing technique. The non-interlace scanning type image sensing device has an advantage in that a higher resolution image can be obtained with less blurring than an image sensed by using a conventional interlace scanning type image sensing device even when sensing a moving object. In the interlace scanning type image sensing device, a frame image is composed of two field images which are sensed at different times, usually at a field period interval. Accordingly, there is a problem in which, when sensing a moving object, there are notches on edges of the object and perhaps of the background in a frame image because of the time gap between the two field images composing a frame image. If a frame image is made of image data of a single field image to overcome the aforesaid problem, there would not be notches on edges, however, the vertical resolution of the obtained frame image is halved. In contrast, with a non-interlace scanning type image sensing device, it is possible to sense a frame image in a field period, thus, the non-interlace scanning type image sensing device is expected to be applied to a still image camera and a camera for EDTVII, for example.

A general image sensing apparatus using an image sensing device which outputs signals after adding two vertically adjacent pixel charges will be explained with reference to FIG. 22.

Referring to FIG. 22, an image sensing device 901 output signals after adding two vertically adjacent pixel charges in accordance with timing signals t1 and t2 generated by a timing signal generator (TG) 909. The output image signals are inputted to a correlated double sampling (CDS) circuit 903 via a buffer 902, and reset noises of the image sensing device 901 are removed from the output image signals by the CDS circuit 903., then the image signals enter an automatic gain controller (AGC) 904. In the AGC 904, the image signals are amplified by a gain set in accordance with a control signal c2 from a microcomputer 908 (gain control). The gain-controlled image signals are converted into digital signals by an analog-digital (A/D) converter 905, then transmitted to a camera processing circuit 906, where predetermined processes are applied to the digital image signals and a luminance signal Y and a color difference signal C are outputted. Further, the microcomputer 908 generates a control signal c2 for controlling the gain in the AGC 904 in accordance with the gain information c1 detected by a camera processing circuit 906.

Most of the non-interlace scanning type image sensing devices used at the present time are provided with R, G and B filter chips arranged in so-called Bayer arrangement as shown in FIG. 23. In this color arrangement, G signal is used as a luminance signal. Further, the non-interlace scanning type image sensing devices output image data of one frame in a field period, thus the speed for transferring charges is two times faster than the transferring speed of an image sensing device, as shown in FIG. 22, which outputs image signals obtained by adding two vertically adjacent pixel charges. Accordingly, it is preferred to design an image sensing device to have two horizontal registers which respectively transfer image signals of odd and even lines simultaneously to be first and second output signals, instead of transferring by one line through a single horizontal register.

In this case, the buffer 902, the CDS circuit 903, the AGC 904, and the A/D converter 905 shown in FIG. 22 are needed for each of the two horizontal registers. In a case where image signals are obtained from an image sensing device provided with a color filter of Bayer arrangement as shown in FIG. 23, the G signals are obtained from all the corresponding pixels by horizontally interpolating by using signals obtained at G filter chips (i.e., G signals) as shown in FIG. 24A. The G signals obtained as above are converted into luminance signals to be displayed. However, if image signals to be displayed are obtained in this manner, difference in characteristic between the two AGCs will affect the quality of an image.

The AGCs change gains to be applied to image signals when a gain is provided, and the two AGCs have different characteristics from each other in general. Therefore, even though the same gain is provided to the two AGCs, the levels of amplified image signals may differ from each other. If this occurs, when an object of a uniform color (e.g., a white paper) is sensed, a variation in output signal level of the two AGCs appears in a stripe pattern of odd and even lines. Therefore, when an image of the object is displayed, the variation in output signal level appears as the difference in output signal level between odd and even line fields on a display as shown in FIG. 24B, which causes field flicker. This noticeably deteriorates the quality of the image.

To overcome this problem, a method for interpolating an average of pixel values of the G signals in a vertical row can be considered. However, in this method, when an object of a uniform color (e.g., a white paper) is sensed, a variation in output signal level of the two AGCs may cause vertical stripes which alternatively have different output levels on a display as shown in FIG. 24C. The difference in output level in the vertical stripes also noticeably deteriorates the quality of an image.

Further, in order to compensate a variation in output signal level of the two AGCs, feed-back control is considered. Feed-back control can be performed in the following sequence, for example. First, a test signal is inputted to the two horizontal registers of the image sensing device at predetermined timing, then the test signals outputted from the two horizontal registers are processed in the same manner of processing image signals. Then, the difference in output level between the two AGCs is detected. On the basis of the detected difference in output level, new gains to be provided to the AGCs are adjusted. Thereafter, a test signal is inputted to the horizontal registers again so as to confirm that the difference in output level between two AGCs are corrected.

As described above, if there is a variation in characteristic between two AGCs, it is possible to compensate a variation in output signal level between the two AGCs by performing feed-back control.

However, in the aforesaid method, a problem in which the size of a hardware increases is posed in providing a feed-back control function for compensating a variation in output signal level between two AGCs, since a circuit necessary for performing the feed-back control has to be added.

Further, because of an arrangement of pixels for luminance signals (i.e., pixels with "G" filter chips) as shown in FIG. 23, the following problem arises. FIG. 25 is a graph showing a spatial frequency plane. In FIG. 25, the abscissa denotes a spatial frequency in the horizontal direction, the ordinate denotes a spatial frequency in the vertical direction, and the oblique axis denotes the spatial frequency in the oblique direction. In FIG. 25, the spatial frequencies at ○ marks are the spatial sampling frequency decided in accordance with the number of pixels, and so on, of CCD (the spatial sampling frequencies in the horizontal, vertical and oblique directions are respectively referred as "fs-h", "fs-v", and "fs-o", hereinafter). When signal components having these sampling frequencies are sampled, the obtained signals appear as a direct current component signal, which gives bad effects on an image. Therefore, it is necessary to remove signal components of the sampling frequencies from the image.

As a method for removing such the frequency components from the image, an optical crystal low-pass filter (referred as "O-LPF", hereinafter) is generally used. More specifically, with an O-LPF designed to have null points at spatial frequencies shown by three ○ in FIG. 25 in the oblique direction, it is possible to effectively remove sampling frequency components not only in the oblique direction but also in the horizontal and vertical directions.

However, moire due to signal components, shown by ⊙ in FIG. 25, having Nyquist frequencies which are half of the sampling frequencies (i.e., ½(fs-h), ½(fs-v), and ½(fs-o)) also appear on an image, which deteriorates the image. Especially, the moiré which appears in the oblique direction has very large component signals, and it appears even more clearly when displaying a moving image and an image obtained while panning a camera. However, the aforesaid O-LPF can not remove such moiré.

In order to overcome this problem, it is possible to use an O-LPF designed to have null points at spatial frequencies shown by ⊙ in FIG. 25 in the oblique direction, similarly to the O-LPF for removing signal components of sampling frequencies, to remove signal components of Nyquist frequencies in the horizontal, vertical and oblique directions. However, in this methods, a bandwidth of luminance signals obtained when an image is formed on the non-interlace type image sensing device becomes narrow. Furthermore, when another filter is used, response in the bandwidth drops dramatically. Thus, a resultant image will not be expressed sharply.

In addition, an image sensed by the aforesaid non-interlace scanning type image sensing device can be displayed both by a non-interlace method and by an interlace method. Accordingly, as an image sensing apparatus having a non-interlace scanning type image sensing device, one which can switch between outputting an image for a interlace type display and outputting an image for a non-interlace type display is demanded.

Further, there is a demand for inputting photograph data to a personal computer. Especially, there is a demand for taking an image into the personal computer from a negative film since images sensed by using a camera are often stored in negative films.

SUMMARY OF THE INVENTION

The present invention has been made in consideration of above situation, and has as its object to effectively prevent deterioration of the quality of an image due to a variation in amplification characteristic in each line upon reading image signals by a plurality of lines and due to an arrangement of a color filter.

Further, it is another object to prevent deterioration of the quality of an image due to a variation in amplification characteristic in each line upon reading image signals by a plurality of lines and due to an arrangement of a color filter by using a simple circuit configuration without adding a feed-back type correction circuit.

According to a preferred configuration of the present invention, each color signals obtained by separating image signals which are read from an image sensing device are processed by a properly designed two-dimensional filter. With this two-dimensional filter, it is possible to remove signal components of Nyquist frequencies in the horizontal, vertical and oblique directions, thereby harmful signals due to a variation in amplification characteristic (gain), which appears as a variation of luminance signals having Nyquist frequencies, corresponding to each of a plurality of horizontal registers of the image sensing device and due to an arrangement of a color filter are effectively removed. As a result, the quality of an image is improved.

It is still another object of the present invention to enable to switch between image signal outputs conforming to a plurality of display methods in an image sensing apparatus.

Further, it is still another object of the present invention to enable to change characteristics of image signals to be outputted depending upon the state of an object and the type of output device. More specifically, it is an object to provide an image sensing apparatus capable of setting characteristics of edge enhancement signal frequencies in accordance with a state of an output device.

Furthermore, it is still another object of the present invention to reduce the size of a circuit for negative-positive inversion as well as to provide an image signal control circuit for achieving a sufficient white balance adjustment.

Further, it is still another object of the present invention to realize a circuit which reads and processes image signals from a non-interlace scanning type image sensing device by inputting two alternate scan lines so as to be able to switch between different signal output formats (e.g., interlace output and non-interlace output) with a simple circuit configuration.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7A is a diagram for explaining interpolation of G signals;

FIG. 7B is a diagram for explaining a variation of G signals caused by a variation in amplification characteristic between AGCs;

FIGS. 11A to 11F are timing charts for explaining operation of the scanning operation switch circuit shown in FIG. 8;

FIG. 13 is a graph showing transmission characteristics of the edge enhancing circuit;

FIGS. 17A to 17C are timing charts for explaining operation of the time-division multiplexing circuit 109 shown in FIG. 15;

FIGS. 18A to 18C are timing charts respectively showing operations of line memories 110 and 111 shown in FIG. 15;

FIG. 18D is a diagram for explaining an arrangement of pixels shown by timing charts in FIGS. 18A to 18C;

FIGS. 21A to 21G are timing charts for explaining operation of a scanning operation switch circuit according to the third embodiment;

DETAILED DESCRIPTION OF THE PREFERRED EMBODIMENTS

Preferred embodiments of the present invention will be described in detail in accordance with the accompanying drawings.

First Embodiment

Figure 1:
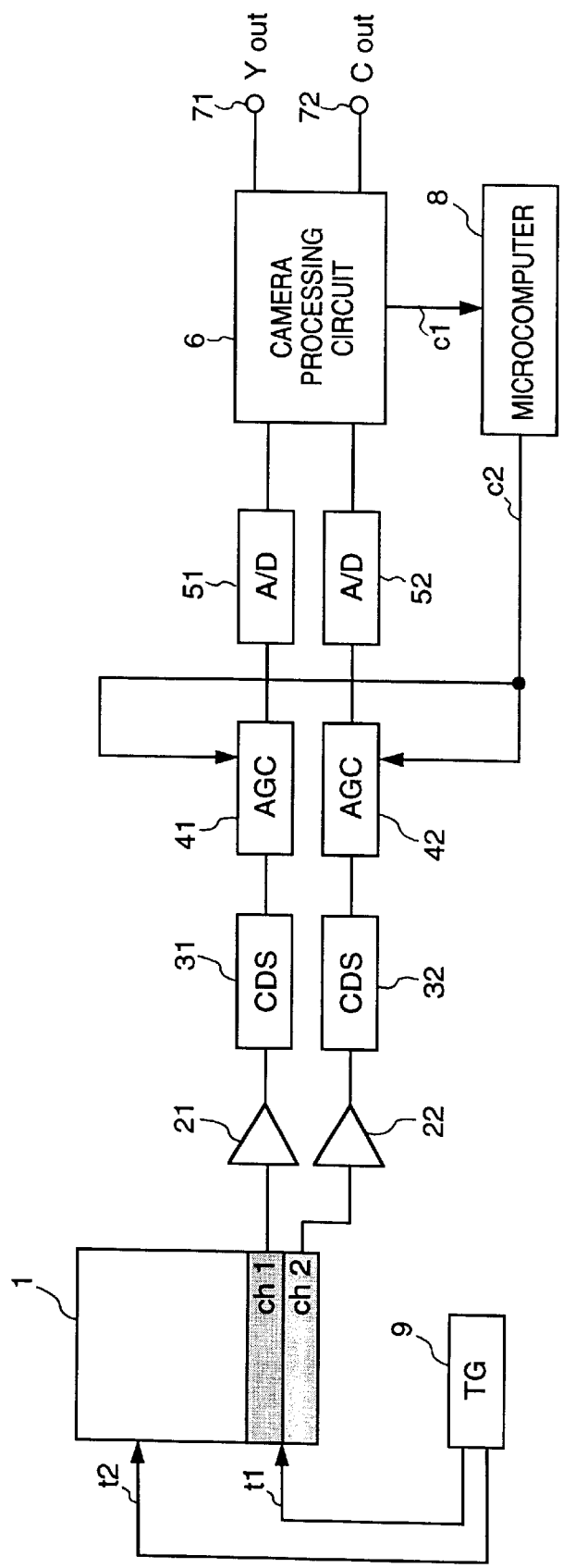
FIG. 1 is a block diagram illustrating a configuration of an image sensing apparatus according to a first embodiment.
Figure 2:
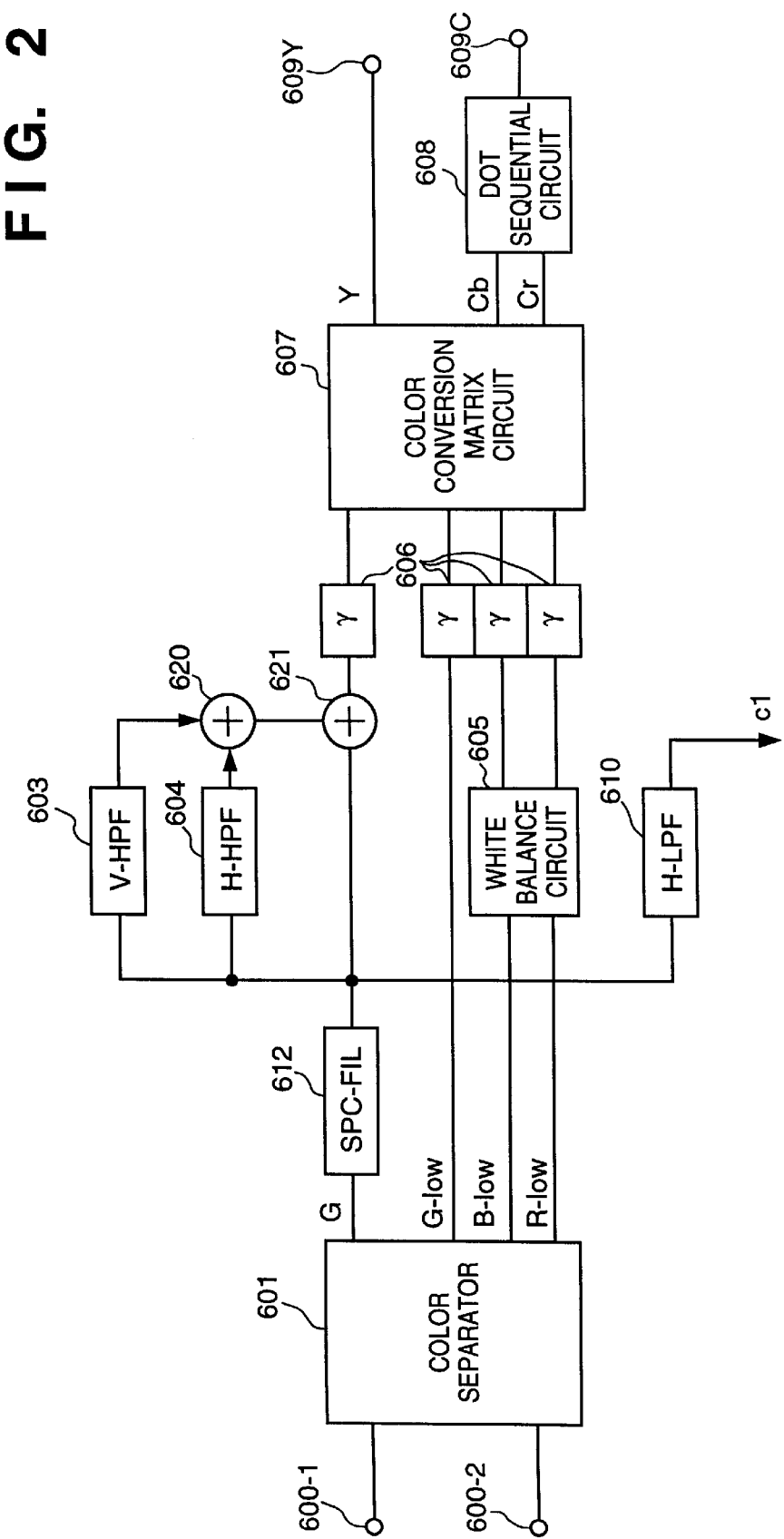
FIG. 2 is a block diagram illustrating a configuration of a camera processing circuit according to the first embodiment.

FIG. 1 is a block diagram illustrating a configuration of an image sensing apparatus according to a first embodiment. Further, FIG. 2 is a block diagram illustrating a configuration of a camera processing circuit according to the first embodiment.

Figures 23, 24A, 24B, 24C:
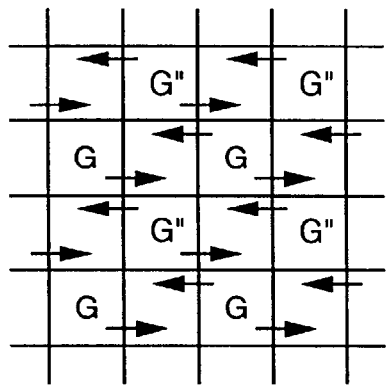
FIG. 23 is an explanatory view showing an arrangement of a color filter.
FIG. 24A is an explanatory view showing an example of interpolation of G signals.
FIGS. 24B and 24C are explanatory views showing a variation of signals G caused by a variation in amplification characteristic between AGCs.
Figure 25:
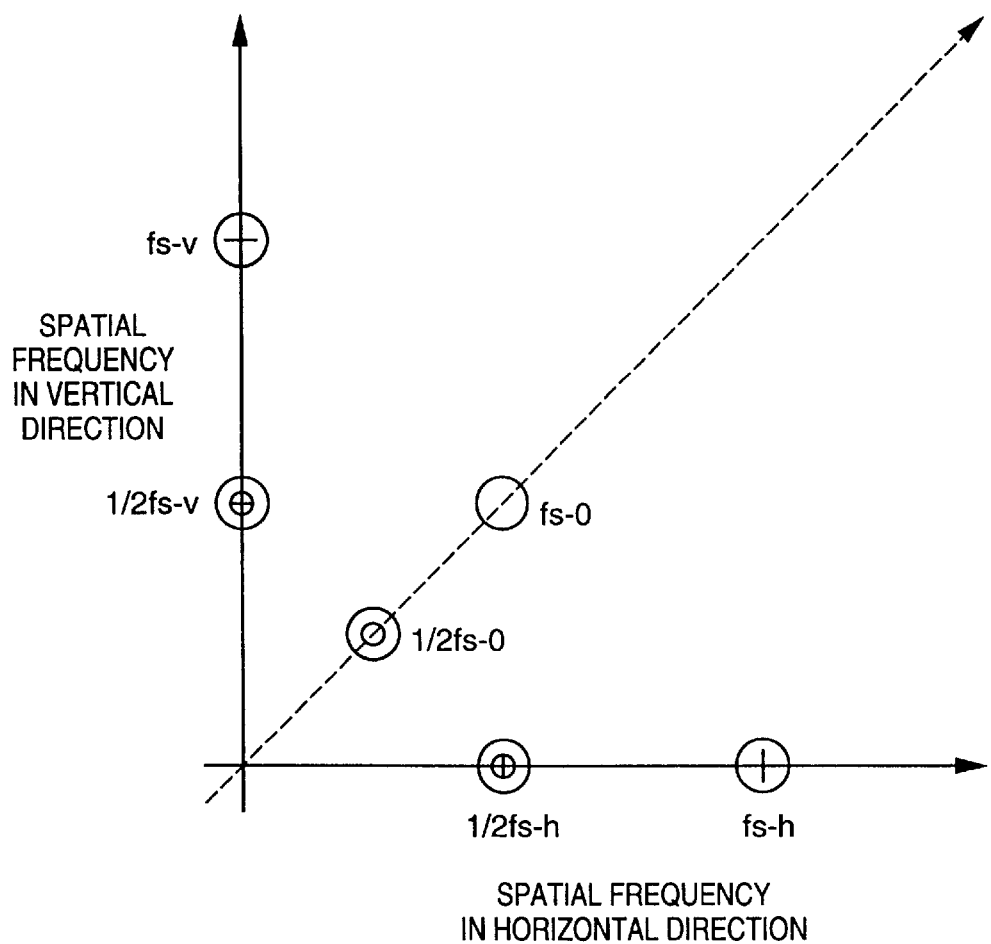
FIG. 25 is a graph showing characteristics of carrier frequencies of luminance signals.

In FIG. 1, reference numeral 1 denotes an image sensing device on which an RGB filter of Bayer arrangement, as shown in FIG. 23, is provided. Reference numerals 21 and 22 denote buffers; 31 and 32, correlated double sampling (CDS) circuits which have a function of removing reset noises of the image sensing device 1; 41 and 42, automatic gain controllers (AGCs) to which signals designating gains are inputted and which change signal levels on the basis of the designated gains; 51 and 52, analog-digital (A/D) converters for converting image signals obtained from the image sensing device 1 into digital data; and 6, a camera processing circuit for processing digital image data inputted from the A/D converters 51 and 52 and generating luminance signals and color signals, then outputting these signals to output terminals 71 and 72. The camera processing circuit 6 will be explained later in detail with reference to FIG. 2.

Figure 3:
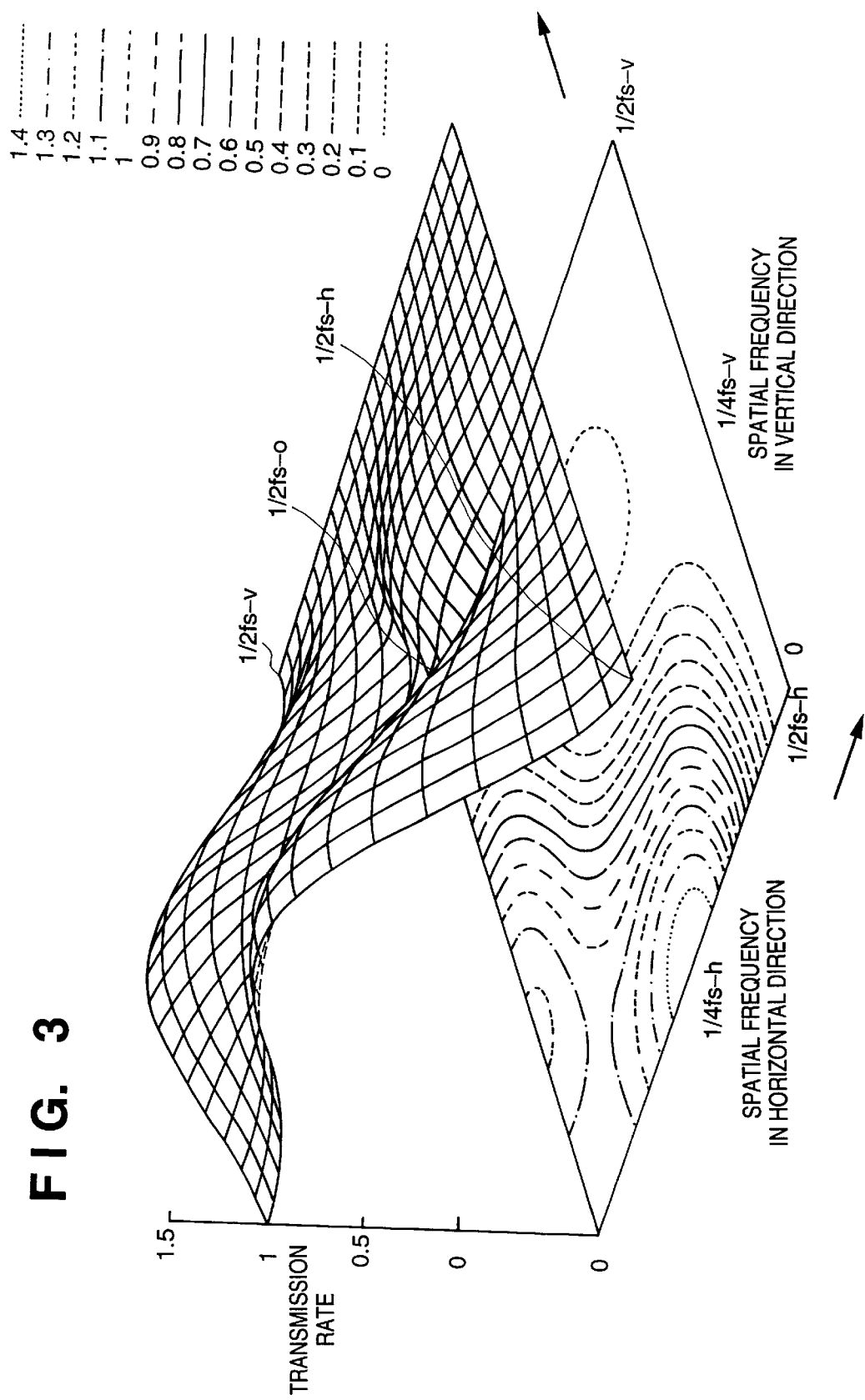
FIG. 3 is a graph showing characteristics of a two dimensional filter according to the first embodiment.

Further, reference numeral 8 denotes a microcomputer which sets gains for the AGCs 41 and 42 on the basis of information on gains, c1, outputted from the camera processing circuit 6; and 9, a timing signal generator (TG) for outputting timing signals, t1 and t2, for controlling the timing of transferring the image signals through vertical registers and horizontal registers of the image sensing device 1. In the camera processing circuit shown in FIG. 2, reference numerals 600-1 and 600-2 denote input terminals for inputting digital image data from the A/D converters 51 and 52; 601, a color separator for performing interpolation processes, and so on, on the input digital image data, and generating and outputting G signals for wide bandwidth processing and G-low, B-low and R-low signals for narrow bandwidth processing; 612, a two-dimensional filter (SPC-FIL) having spatial frequency characteristics as shown in FIG. 3; 603, a vertical high-pass filter (V-HPF) which transmits high frequency components in the vertical direction of a signal input via the SPC-FIL 612 and generates edge signals in the vertical direction; and 604, a horizontal high-pass filter (H-HPF) which transmits high frequency components in the horizontal direction of the signal input through the SPC-FIL 612 and generates edge signals in the horizontal direction. The edge signals in the vertical and horizontal directions obtained as above are combined by an adder 620 and become an edge enhancement signal. The edge enhancement signal is further combined with the output from the SPC-FIL 612 by an adder 621, then inputted to a γ processing circuit 606.

Reference numeral 605 denotes a white balance circuit which adjusts white balance of B-low and R-low signals. The signals adjusted by the white balance circuit 605 are inputted to γ-processing circuits 606 which applies γ conversion to each of the input signals.

Further, reference numeral 607 denotes a color conversion matrix circuit for generating luminance signal Y and color signals Cb and Cr on the basis of the G signal on which edge enhancement and γ-processing are processed and G-low, B-low and R-low signals on which white balance adjustment and γ-processing are processed, then outputting the generated signals. Note, the high frequency components of the luminance signal Y are generated on the basis of the signal G, and the low frequency components of the luminance signal Y are generated on the basis of the signals G-low, B-low and R-low.

Next, an operation of the image sensing apparatus having the above configuration according to the first embodiment will be explained.

Referring to FIG. 1, the non-interlace scanning type image sensing device 1 transfers signals via the vertical registers and the horizontal registers in accordance with the timing signals t1 and t2 provided from the TG 9, then outputs signals of odd and even number scan lines from channels ch1 and ch2, respectively. The output signals from the channels ch1 and ch2 correspond to odd lines and even lines of the non-interlace scanning type image sensing device 1, respectively, and are outputted to the CDS circuits 31 and 32 via the buffers 21 and 22, respectively. The CDS circuits 31 and 32 remove reset noises of the image sensing device 1 from the output image signals, then transmit the image signals to the AGCs 41 and 42. The AGCs 41 and 42 amplify the image signals with gains designated by the microcomputer 8 on the basis of the difference between amplification characteristics of the AGCs 41 and 42, detected by the camera processing circuit 6. The A/D converters 51 and 52 convert analog image signals into digital signals, and output the digital signals to the camera processing circuit 6.

FIG. 2 is a block diagram illustrating a detailed configuration of the camera processing circuit 6. Image signals outputted from the channels ch1 and ch2 of the non-interlace scanning type image sensing device are inputted to the camera processing circuit 6 through the input terminals 600-1 and 600-2, respectively. The color separator 601 generates signals G, G-low, B-low and R-low on the basis of data of G pixels, B pixels and R pixels sequentially inputted in accordance with the pixel arrangement as shown in FIG. 23. When generating the G-low signal, values corresponding to non-G pixels are interpolated with averages of their upper and lower pixel data (average value interpolation in the vertical direction) so that every pixel has G value. Further, when generating the B-low signal, values corresponding to non-B pixels are interpolated with averages of their upper and lower and/or right and left B pixel data so that all the pixels have B values. For example, in a pixel arrangement as shown in FIG. 23, an pixel between two B pixels in the vertical direction is interpolated with an average of these two B pixel values, and an pixel between two B pixels in the horizontal direction is interpolated with an average of these two B pixel values. As for a pixel whose upper, lower, right and left pixels are not B pixels, an average of four B pixel values at the four corners is used to interpolate the pixel of interest. Further, for obtaining R-low signal, interpolation similarly to the one performed for obtaining the B-low signal is performed. Further, the G signal is obtained after assigning the value 0 to non-G pixels (zero interpolation).

The G signal obtained as above is inputted to the SPC-FIL 612. FIG. 3 shows a graph showing the spatial frequency characteristics of the SPC-FIL 612. In FIG. 3, x axis denotes spatial frequency in the horizontal direction, y axis denotes spatial frequency in the vertical direction, and z axis denotes transmission rate. As shown in FIG. 3, the SPC-FIL 612 traps Nyquist frequencies in the horizontal, vertical and oblique directions (i.e., ½(fs-h), ½(fs-v), ½(fs-o)).

The G signal inputted from the color separator 601 is processed so that components having Nyquist frequencies in the horizontal, vertical and oblique directions are removed by the SPC-FIL 612. As a result, moiré of the luminance signals which conventionally appears in the horizontal, vertical and oblique directions can be removed.

Figures 26A, 26B, 26C:
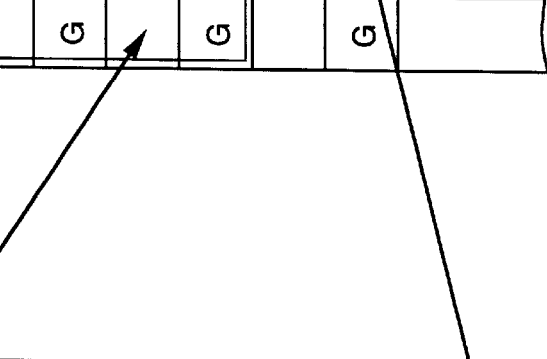
FIGS. 26A to 26C are drawings for explaining coefficients of two-dimensional filter.

In the SPC-FIL 612, a 5×5 matrix as shown in FIG. 26A, for example, is applied to data of a 5×5 pixel matrix having a pixel of interest at its center to obtain a value of the pixel of interest. Note, since the zero interpolation is performed by the color separator 601 for obtaining the G signal in this case, G pixel values and the value 0 appear in a check pattern as shown in FIG. 26B. Therefore, in a case where the pixel of interest in the matrix shown in FIG. 26B is a G pixel, the coefficients indicated by α in FIG. 26A (i.e., $a_{11}, a_{13}, \ldots, a_{55}$) are applied to G pixel values, and other coefficients apply to pixel values assigned to 0. In other words, the coefficients which are not indicated by ○ in FIG. 26A (i.e., $a_{12}, a_{14}, \ldots, a_{54}$) are not used in practice. Whereas, in a case where the pixel assigned to 0 is the pixel of interest, the coefficients indicated by ○ in FIG. 26C (i.e., $a_{12}, a_{14}, \ldots, a_{54}$) are applied to G pixel values, and other coefficients apply to pixel values assigned to 0. In other words, the coefficients which are not indicated by ○ in FIG. 26C (i.e., $a_{11}, a_{13}, \ldots, a_{55}$) are not used in practice. It should be noted that, in the first embodiment, the SPC-FIL 612 is designed so that the sum of the coefficients indicated by ○ in FIG. 26A equals to the sum of the coefficients indicated by ○ in FIG. 26C. In other words, the SPC-FIL 612 is designed so that the matrix sums of two sets of complementary coefficients taken in check pattern order from the coefficient matrix of the SPC-FIL 612 are the same.

Figures 7A, 7B:
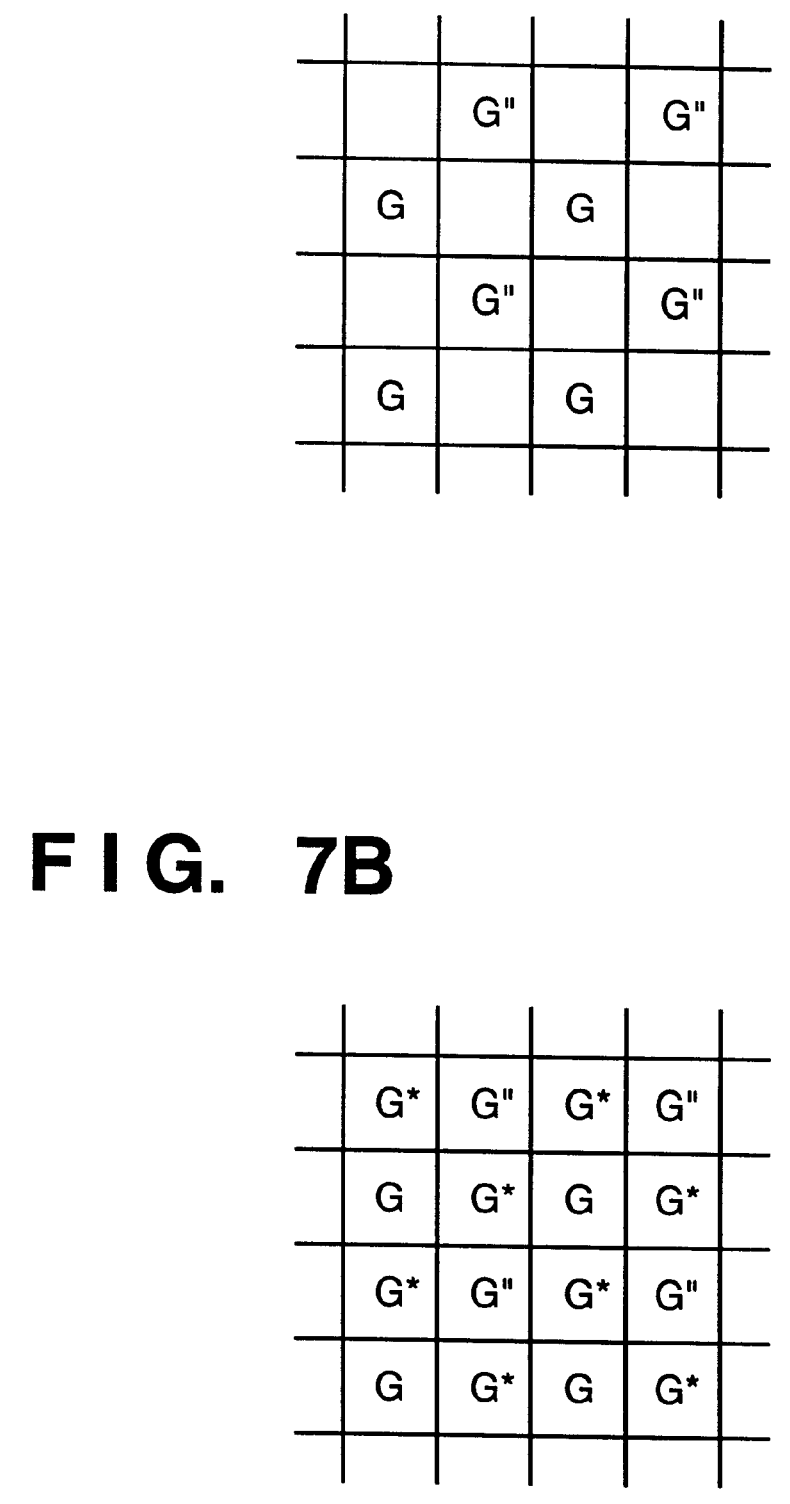

After gains are assigned to the AGCs 41 and 42, the AGCs 41 and 42 amplifies image signals with the designated gains. However, since the characteristics of the AGCs 41 and 42 differ from each other, levels of amplified image signals may differ even though the same gains are designated. As a result, odd and even lines, odd and even pixels may have different output levels. Therefore, when a uniform color (e.g., a white paper) is sensed, for example, a variation in amplification characteristic between the AGCs 41 and 42 may clearly appear in a check pattern in a displayed image as shown in FIG. 7B. Thus, quality of an image drops considerably. Especially, this variation appears clearly as a variation of luminance signals having Nyquist frequencies.

However, according to the first embodiment, since frequency component of ½(fs-v) of the G signal in the vertical direction is trapped by the SPC-FIL 612, output level difference between odd and even lines which appears as a variation of luminance signals having Nyquist frequency in the vertical direction is removed. Furthermore, since the frequency component of ½(fs-h) of the G signal in the horizontal direction is also trapped by the SPC-FIL 612, output level difference between odd and even pixels which appears as a variation of luminance signals having Nyquist frequency in the horizontal direction is removed. Similarly, since the frequency component of ½(fs-o) of the G signal in the oblique direction is trapped by the SPC-FIL 612, too, moiré appears as a variation of luminance signals having Nyquist frequency in the oblique direction is also removed.

The G signal processed by the SPC-FIL 612 is branched into two lines. The G signal in one line is converted into an edge enhancement signal by the V-HPF 603, the H-HPF 604 and the adder 620, then inputted to the adder 621. The G signal in the other line is directly inputted to the adder 621. Then, the adder 621 combines these two input signals to generate an edge enhanced G signal.

The G signal processed as above is further processed by the γ-processing circuit 606, then transferred to the color conversion matrix circuit 607. G-low, B-low and R-low signals are adjusted by white balance operation by the white balance circuit 605, processed by the γ-processing circuits 606, then transferred to the color conversion matrix circuit 607. The color conversion matrix circuit 607 performs linear matrix operation and RGB-YCbCr conversion upon reception of G, G-low, B-low and R-low signals. The luminance signal Y outputted from the color conversion matrix circuit 607 is outputted from an output terminal 609Y. Regarding the color difference signals Cb and Cr, they are performed with band-width compression and dot sequential operation by the dot sequential circuit 608, then outputted from an output terminal 609C.

If the obtained image is dark when sensing an object of low luminance, the gain information c1 obtained from the signal which has passed through a H-LPF 610 is transmitted to the microcomputer 8.

The microcomputer 8 determines gains for the AGCs 41 and 42 on the basis of the data received from the camera processing circuit 6, then outputs a control signal c2. The AGCs 41 and 42 adjust themselves to the desired gain in response to the reception of the control signal c2. When the gain is given, the AGCs 41 and 42 amplifies image signals with the predetermined gain. Since operation of each AGCs 41 and 42 usually differ from each other, the amplified image signals may have different signal levels when the same gain is designated. However, with the aforesaid configuration, even through the output signal levels from the AGCs 41 and 42 differ from each other, ½(fs-h), ½(fs-v) and ½(fs-o) frequency components of the G signal are trapped by the SPC-FIL 612, thereby it is possible to prevent deterioration of the quality of an image due to a variation in level of image signals, and possible to obtain an image of good quality.

Second Embodiment

Figure 4:
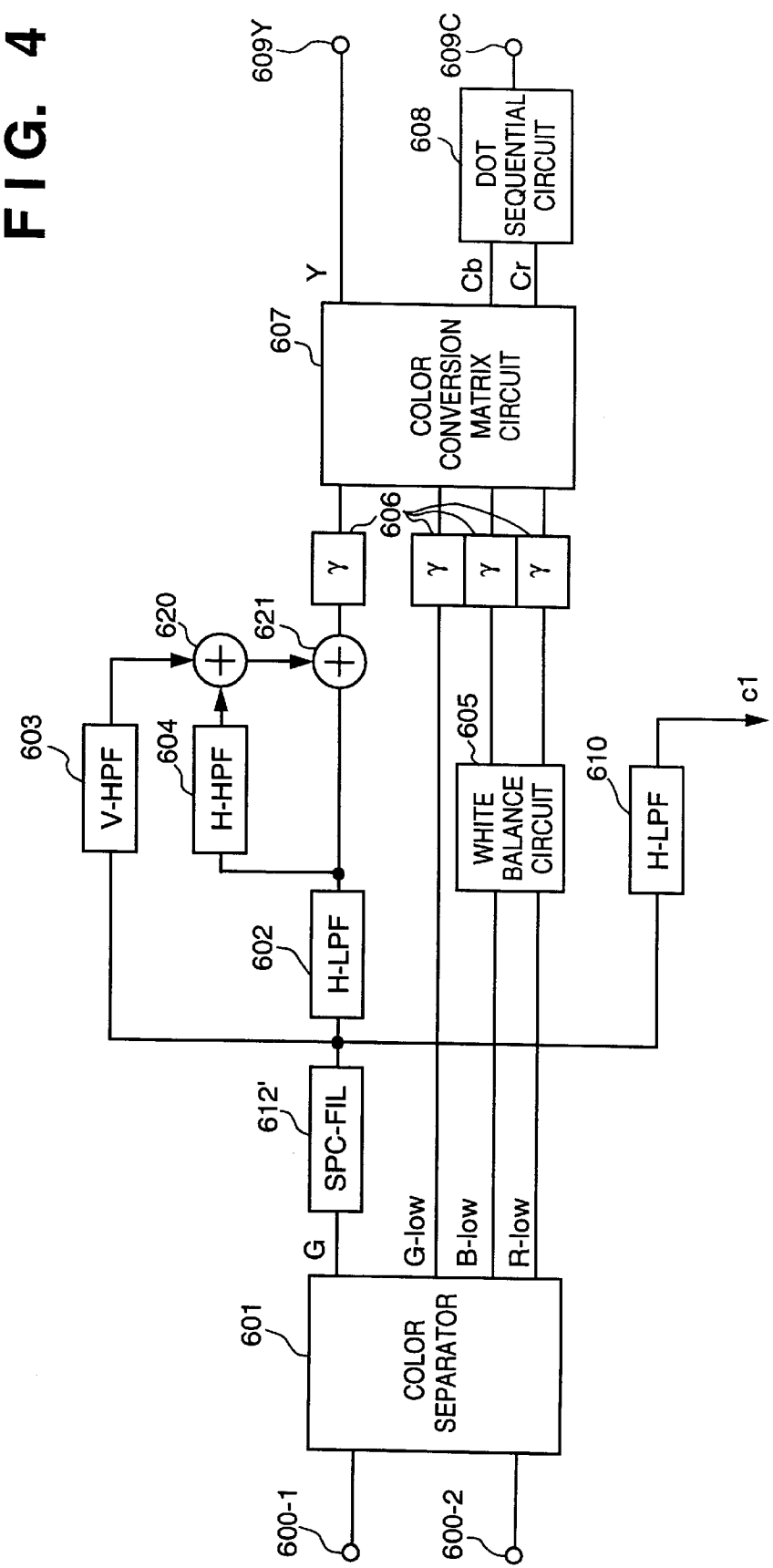
FIG. 4 is a block diagram illustrating a configuration of a camera processing circuit according to a second embodiment.

FIG. 4 shows another configuration of the camera processing circuit 6 shown in FIG. 1 according to a second embodiment.

Figure 5:
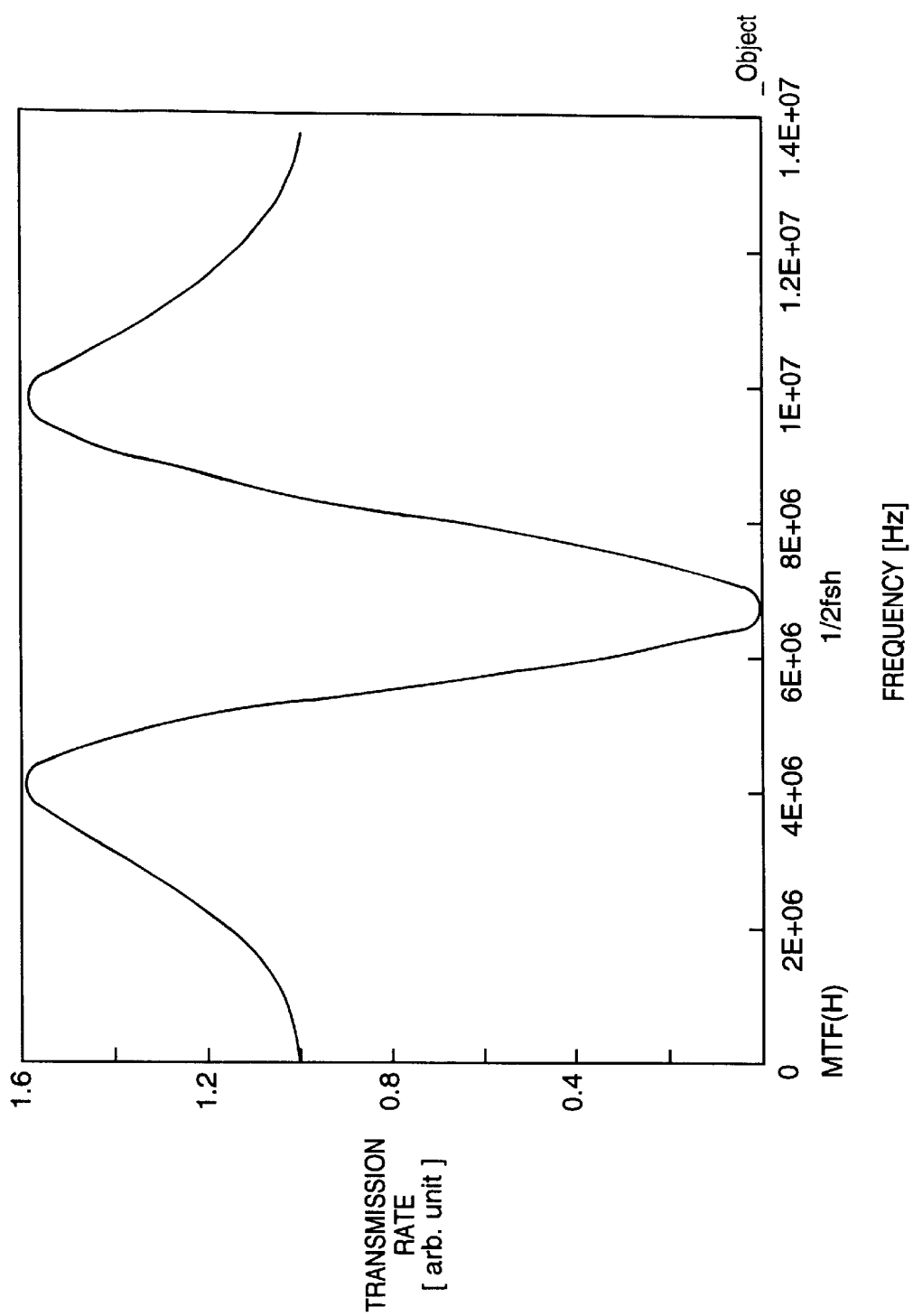
FIG. 5 is a graph showing characteristics of a horizontal filter according to the second embodiment.
Figure 6:
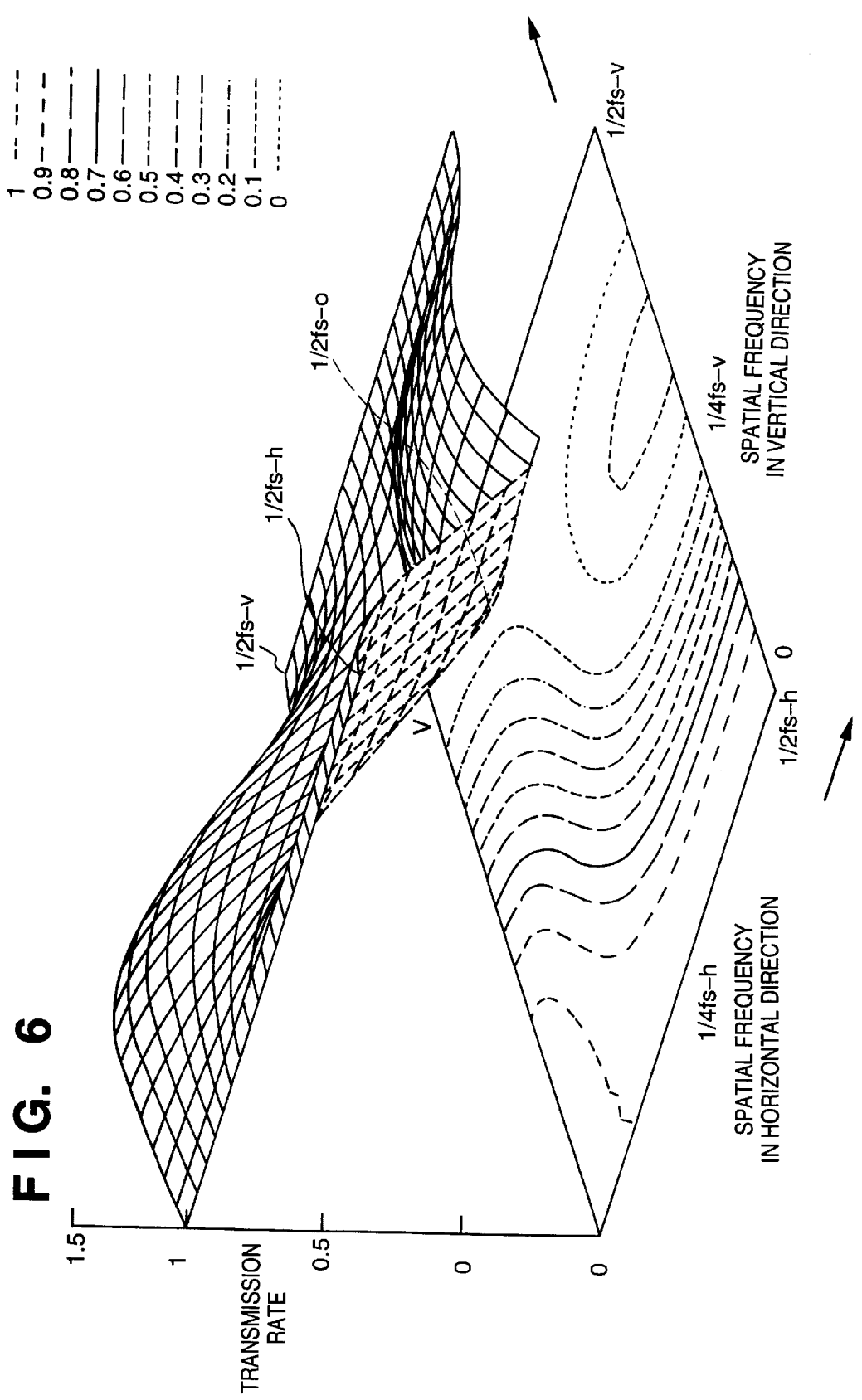
FIG. 6 is a graph showing characteristics of two dimensional filter according to the second embodiment.

In FIG. 4, a horizontal low-pass filter (H-LPF) 602, having the transmission characteristics shown in FIG. 5 is further provided in addition to the circuit shown in FIG. 2. Furthermore, a two-dimensional filter (SPC-FIL) 612', having the transmission characteristics shown in FIG. 6 is also provided.

Next, an operation according to the second embodiment will be described.

The color separator 601 operates as in the first embodiment.

The G signal, obtained after applying zero interpolation, which is output from the color separator 601 is inputted to the SPC-FIL 612'. Then, components having Nyquist frequencies in the vertical and oblique directions (½(fs-v) and ½(fs-o)) of the G signal are removed. As a result, moiré which appears in the vertical and oblique directions due to a variation of luminance signals having Nyquist frequencies is removed. Note, similarly to the SPC-FIL 612, the coefficients of the matrix used in the SPC-FIL 612' are designed so that the matrix sums of two sets of complementary coefficients taken in check pattern order from the coefficient matrix are the same.

Next, signals from the SPC-FIL 612' are inputted to the H-LPF 602 having the transmission characteristics shown in FIG. 5, for example. FIG. 5 is a graph showing the spatial frequency transmission characteristics of the H-LPF 602. In FIG. 5, the abscissa denotes spatial frequency in the horizontal direction, and the ordinate denotes transmission rate of the filter. With the H-LPF 602 having the above characteristics, signal component having Nyquist frequency in the horizontal direction (i.e., ½(fs-h)) is trapped. As a result, moiré in the vertical direction which appears as a variation of luminance signals having Nyquist frequency in the horizontal direction is removed. Note, the reason why two filters SPC-FIL 612' and H-LPF 602 are used is that it is difficult to obtain a desired characteristics only by using the single SPC-FIL 612 as in the first embodiment when a user wants to change characteristics of a horizontal filter in accordance with a state of an image.

As described above, although the same gain is designated to the AGCs 41 and 42, output levels in odd and even lines and odd and even pixels differ because of the variation in characteristic of the AGCs. As a result, output levels differ in a check pattern in a displayed image as shown in FIG. 7B when a uniform color (e.g., white paper) is sensed by using a conventional image sensing apparatus. According to the second embodiment, a spatial frequency component of ½(fs-v) in the vertical direction of the G signal is trapped by the SPC-FIL 612', therefore output level difference between odd and even lines which is caused by a variation of luminance signals having Nyquist frequency in the vertical direction (½(fs-v)) is compensated. Furthermore, a spatial frequency component of ½(fs-h) in the horizontal direction of the G signal is trapped by the H-LPF 602, therefore output level difference between odd and even pixels which is caused by a variation of luminance signals having Nyquist frequency in the horizontal direction (½(fs-h)) is compensated. In addition, a spatial frequency component of ½(fs-o) in the oblique direction of the G signal is trapped by the SPC-FIL 612', therefore moiré which appears in the oblique direction caused by a variation of luminance signals having Nyquist frequency in the oblique direction (½(fs-o)) is removed. As a result, a variation of luminance signals having Nyquist frequencies in the vertical, horizontal and oblique directions is compensated, thereby the quality of an image is improved.

The subsequent processes are performed in the similar manner as in the first embodiment. Thus, the aforesaid problem caused by a variation in amplification characteristic between the AGCs 41 and 42 when the same gain is give to the AGCs 41 and 42 from the microcomputer 8 is solved, since a frequency component of ½(fs-h) is trapped by the H-LPF 602 and frequency components of ½(fs-v) and ½(fs-o) are trapped by the SPC-FIL 612'. As a result, an image of high quality can be obtained.

By providing the SPC-FIL 612' which traps frequency components having ½ of the sampling frequencies in the vertical and oblique direction and the H-LPF 602 which traps frequency components having ½ of the sampling frequency in the horizontal direction in a luminance signal processing system, it is possible to effectively compensate a variation in amplification characteristic between the AGCs without need for hardware expansion, since the variation in amplification characteristics of the AGCs 41 and 42 is removed by the filters as a variation of luminance signals having Nyquist frequencies in the horizontal, vertical and oblique directions.

Third Embodiment

In the first and second embodiments, edge extraction is performed by the V-HPF 603 and H-HPF 604 after the process by the SPC-FIL 612 (or 612'). However, it is possible to configure the image sensing apparatus so as to perform edge extraction by using the G signal output from the color separator 601 before being processed by the two-dimensional filter.

Figure 27:
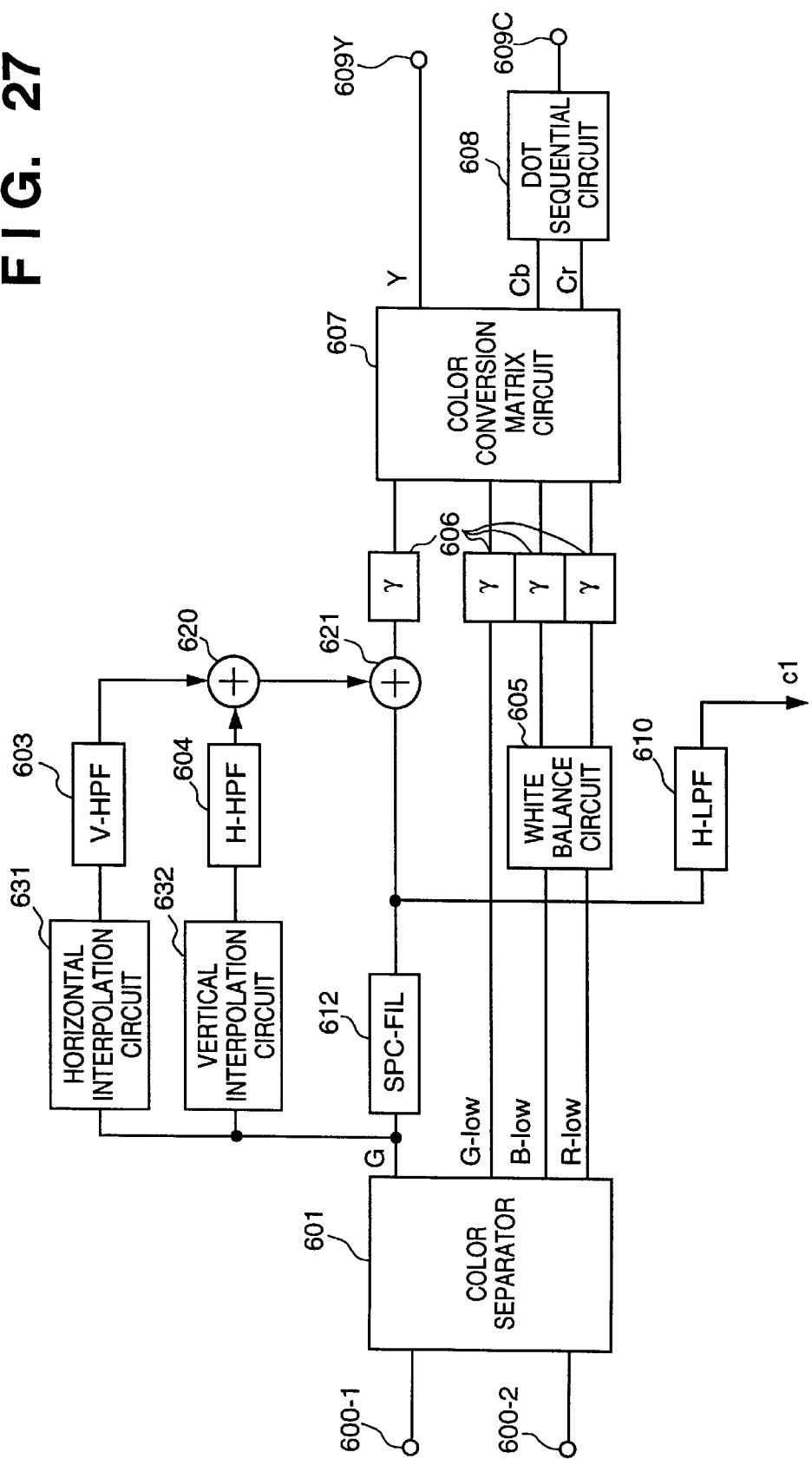
FIG. 27 is a block diagram illustrating a configuration of a camera processing circuit according to the third embodiment.

FIG. 27 is a block diagram illustrating a detailed configuration of a camera processing circuit according to the third embodiment. In FIG. 27, the same units and elements as those in FIG. 2 are referred by the same reference numerals. Reference numeral 631 denotes a horizontal interpolation circuit which interpolates a pixel value assigned to 0 by the color separator 601 with an average of the adjacent right and left G pixel values. Further, reference numeral 632 denotes a vertical interpolation circuit which interpolates a pixel value assigned to 0 by the color separator 601 with an average of the upper and lower G pixel values. Signals outputted from the horizontal interpolation circuit 631 and the vertical interpolation circuit 632 are respectively inputted to the V-HPF 603 and the H-HPF 604 where edge extraction is performed.

According to the third embodiment as described above, an edge enhancement signal is generated on the basis of the G signal which has not interpolated by the two-dimensional filter, thereby it is possible to obtain a sharp image.

It should be noted that the method described in the third embodiment can be applied to the camera processing circuit shown in FIG. 4 in the second embodiment.

According to the first to third embodiment as described above, a variation in amplification characteristic between two AGCs is effectively compensated since the variation is dealt with as a variation of luminance signals having Nyquist frequencies in the horizontal, vertical and oblique directions. Further, a gain control of the AGCs by feed back is not performed, thus the size of the hardware does not increase.

Further according to the second embodiment, transmission characteristics of a filter in the horizontal direction can be easily changed in accordance with a state of an image, thereby it is possible to obtain an image of good quality.

Furthermore, by effectively restraining luminance carrier component in the oblique direction by using a two-dimensional filter, not by using an oblique low-pass filter, it is possible to obtain a sharp image without narrowing a bandwidth of luminance signals.

In addition, according to the first to third embodiments, it is possible to effectively reduce deterioration of an image sensed by using non-interlace scanning type image sensing device on which a color filter of Bayer arrangement is provided.

Fourth Embodiment

Figure 8:
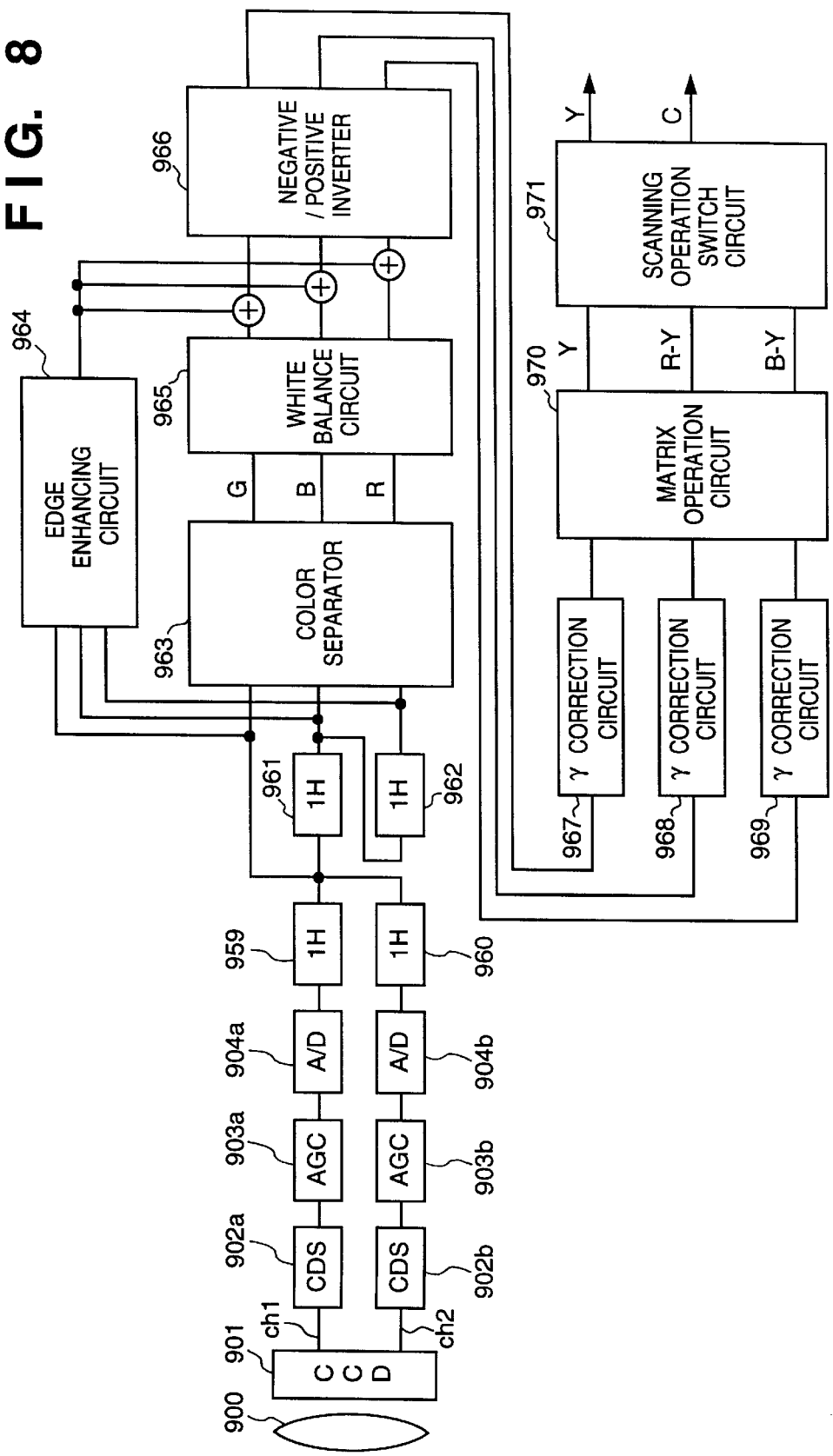
FIG. 8 is a block diagram illustrating a common configuration of an image sensing apparatus which reads image signals by two scan lines.

FIG. 8 is a block diagram illustrating a configuration of an image sensing apparatus according to the fourth embodiment.

Incoming light reflected by an object passes through an optical system 900 and an image is formed on the CCD 901 which is a non-interlace scanning type image sensing device, then converted into electrical signals. A color filter is provided on the CCD 901 for sensing a color image. The color filter has color filter chips arranged in so-called Bayer arrangement as shown in FIG. 23.

The converted electronic signals are outputted from two output terminals (channels ch1 and ch2) of the CCD 901 by two scan lines in parallel. More specifically, signals in odd scan lines are outputted from one terminal, and signals in even scan lines are outputted from the other terminal. This configuration of the CCD 901 enables to output signals of all the pixels in one field period in interlace scanning.

Figure 9:
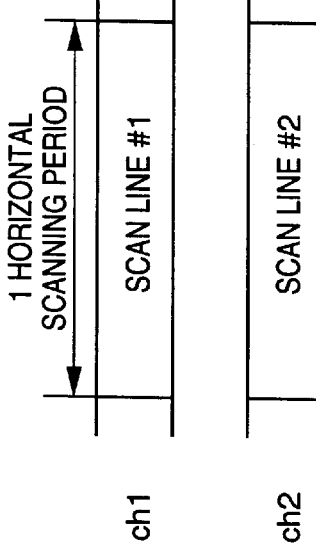
FIGS. 9A to 9E are timing charts for explaining operation of a one horizontal line (1H) memory in the configuration shown in FIG. 8.

Signals outputted from the two terminals respectively processed by correlated double sampling (CDS) circuits 902a and 902b and automatic gain controllers (AGC) 903a and 903b, then converted into digital signals by the A/D converters 904a and 904b. The signals outputted from the A/D converters 904a and 904b are transformed into a line sequential signal as shown in FIGS. 9A to 9E. First, signals of two scan lines are outputted from the channels ch1 and ch2 of the CCD 901 (FIGS. 9A and 9B). One horizontal line (1H) memories 959 and 960 are respectively designed to output inputted signals at timing shown in FIGS. 9C and 9D. Therefore, data obtained by multiplexing the outputs from the 1H memories 959 and 960 becomes a line sequential signal as shown in FIG. 9E. Thereafter, signals of three scan lines are synchronized by using 1H memories 961 and 962, and each signal is inputted to a color separator 963 and an edge enhancing circuit 964.

G, B and R signals separated by the color separator 963 are adjusted their signal levels by a white balance circuit 965, then added to an edge signal extracted by the edge enhancing circuit 964. The added signals are processed by a negative/positive inverter 966, then inputted to γ correction circuits 967, 968 and 969 where performed with γ correction. Thereafter, the signals are converted into a luminance signal Y and color difference signals R-Y and B-Y by a matrix operation circuit 970.

Further, in a case where standard video signals are to be outputted for monitor display, the luminance signal and the color difference signals are processed by a scanning operation switch circuit 971.

Figure 10:
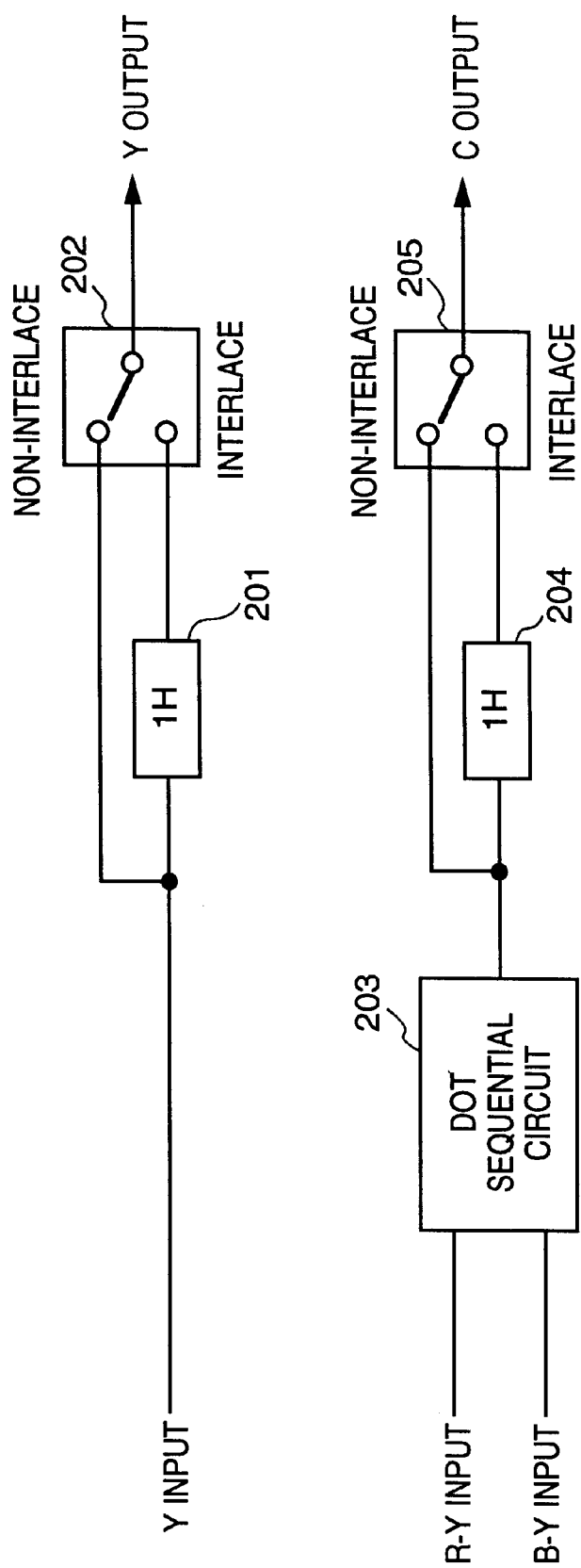
FIG. 10 is a block diagram illustrating a scanning operation switch circuit in the configuration shown in FIG. 8.

The scanning operation switch circuit 971 has a configuration as shown in FIG. 10, for example, and switches between whether outputting the input sequential signals as non-interlace signals or outputting as interlaced signals after transforming the input sequential signals. Referring to FIG. 10, in order to outputting non-interlace signals, the luminance signal Y is directly outputted through the switch 202 and the color difference signals R-Y and B-Y are processed with dot sequential operation by a dot sequential circuit 203 and outputted from a switch 205 as C output. Further, in order to output interlaced signals, switches 202 and 205 are switched, and the luminance signal Y passes through a 1H memory 201, and is outputted from the switch 202. The color difference signals R-Y and B-Y which are performed with dot sequential operation pass through a 1H memory 204 and are outputted from the switch 205. The operational timing is shown in FIGS. 11A to 11F.

More specifically, as shown in FIG. 11A, since luminance signal Y which is suitable for a non-interlace display is outputted from the matrix operation circuit 970, by selecting the output from the matrix operation circuit 970 by the switch 202, the luminance signal which is suitable for a non-interlace display is outputted. In contrast, by inputting the luminance signal Y to the 1H memory 201, time for outputting each pixel is doubled as shown in FIG. 11B, consequently converted into interlaced signals thinned down to signals of every other line. Therefore, when the switch 202 selects the output from the 1H memory 201, the luminance signal which is suitable for an interlace display can be obtained.

Further, the color difference signals R-Y and B-Y inputted in the form as shown in FIGS. 11C and 11D are selected by the dot sequential circuit 203 so as to be a signal shown in FIG. 11E, and outputted as a series of signals. The signal outputted from the dot sequential circuit 203 is suitable for a non-interlace display. Therefore when the switch 205 selects the output from the dot sequential circuit 203, color difference signal suitable for a non-interlace display is outputted. When the color difference signal outputted from the dot sequential circuit 203 is inputted to the 1H memory 203 which functions in a similar manner to the 1H memory 201, color difference signal suitable for an interlace display as shown in FIG. 11F is outputted. Therefore, when the switch 205 selects the color difference signal outputted from the 1H memory 204, the color difference signal suitable for an interlace display is outputted.

It should be noted that odd line field data or even line field data is alternatively input to the aforesaid 1H memories 201 and 204 in each field period in such a manner that the 1H memories 201 and 204 output signals of even lines in the first field then outputs signals of odd lines in the next field, and so on.

Figure 12:
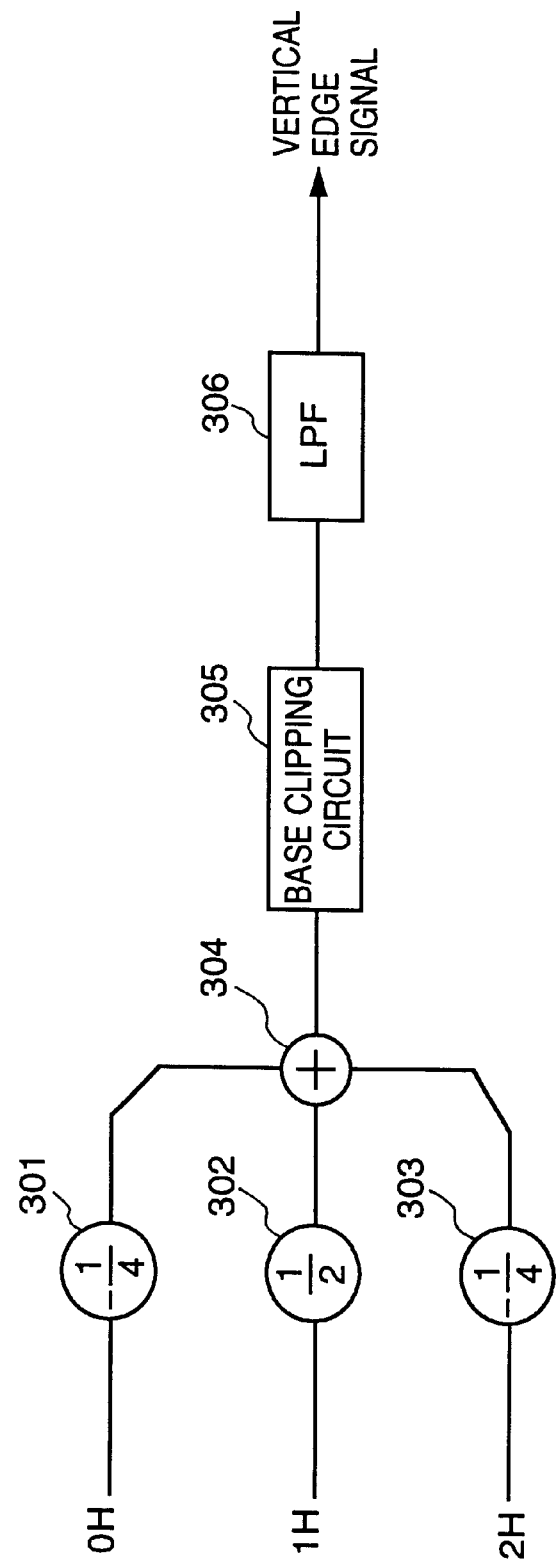
FIG. 12 is a block diagram illustrating a configuration of an edge enhancing circuit in the configuration shown in FIG. 10.
Figure 14B:
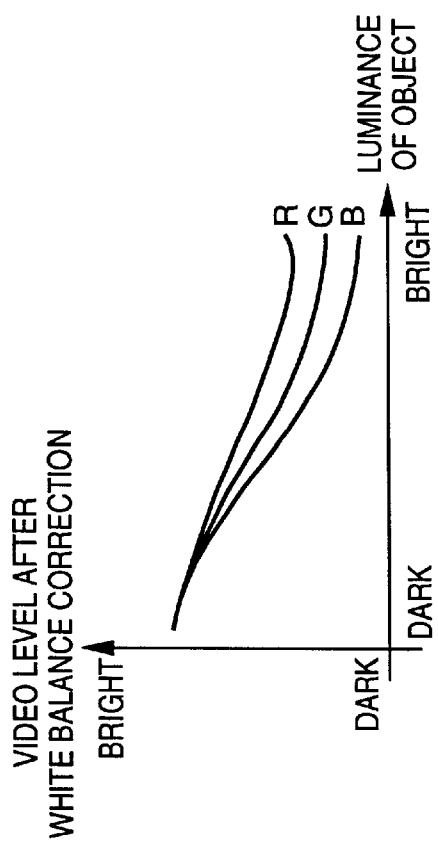
FIGS. 14A to 14D show graphs showing relationships between luminance of an object and a transmittance of a negative film or video signal levels.
Figure 14D:
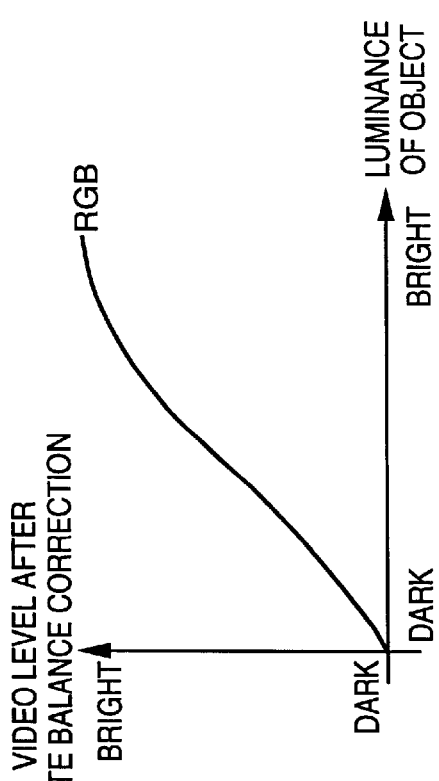
Figure 14A:
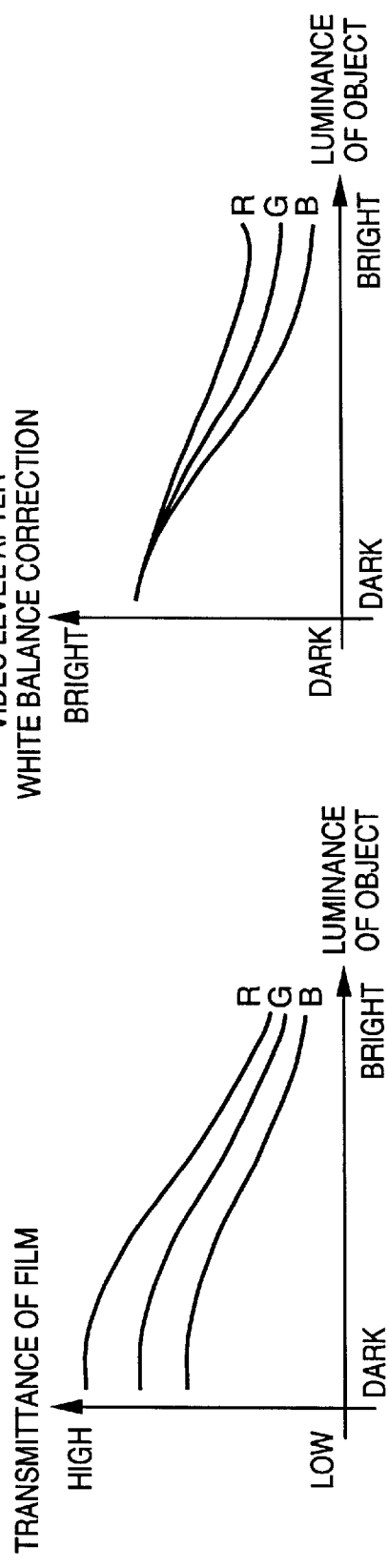
Figure 14C:
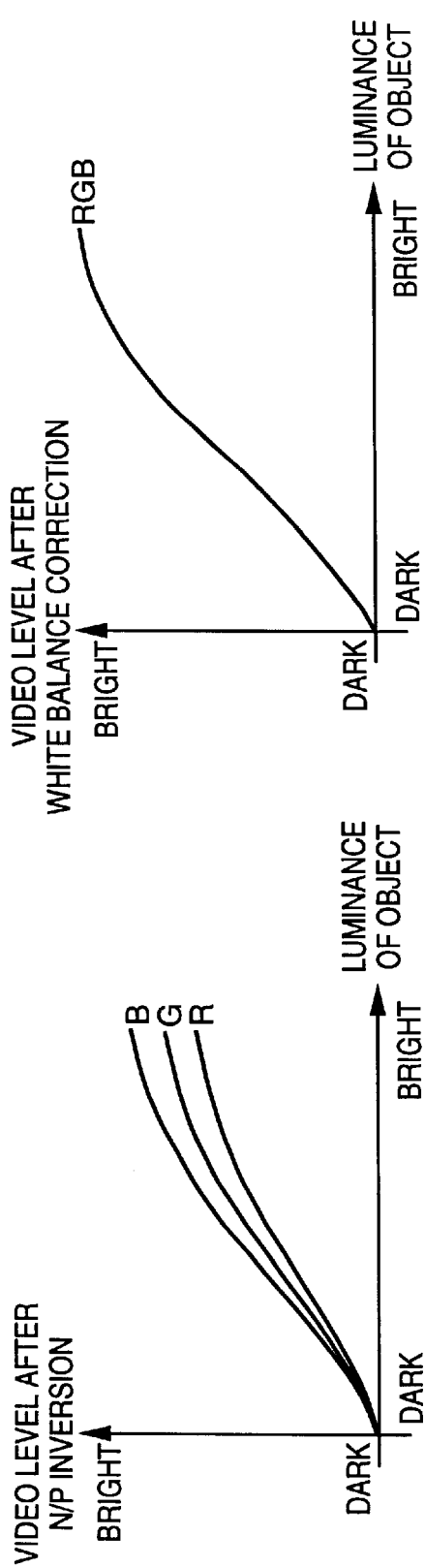

Further, the vertical edge enhancing circuit 964 generates an edge enhancement signal in the vertical direction on the basis of signals of three adjacent scan lines. FIG. 12 shows a configuration of the vertical edge enhancing circuit 964. Referring to FIG. 12, signals in 0H, 1H and 2H are respectively multiplied by $-\frac{1}{4}$, $\frac{1}{2}$ and $-\frac{1}{4}$ by multipliers 301, 302 and 303, then added by an adder 304. The added signal is outputted as a vertical edge signal through a base clipping circuit 305 and a low-pass filter 306. The spatial frequency characteristics of this signal process will be explained referring to an image sensing system of 640×480 pixels.

The transmission characteristics of the vertical edge enhancing circuit 964 in the vertical direction in this case is set to have a shape of cosine function having a maximum at spatial frequency corresponding to 480 TV lines as shown in FIG. 13. More specifically, when a signal having a step waveform is processed by the vertical edge enhancing circuit 964, a signal representing an edge having width of one scan line is added. Accordingly, when the signal is outputted to a printer or a sequential scanning display, it is possible to obtain a clear image.

According to the fourth embodiment as described above, it is possible to switch between sequential scanning and interlace scanning as desired by the scanning operation switch circuit 971. In other words, by using Y signal output from the 1H memory 201 and C signal output from the 1H memory 204, the output signals are of every other lines, i.e., interlaced signals as apparent from FIGS. 11B and 11F. Further, when Y signal output from the matrix operation circuit 970 is directly outputted as Y output, and the output from the dot sequential circuit 203 is directly outputted as C output, non-interlace signals are obtained as apparent from FIGS. 11A and 11E.

Further, since the brightness and darkness of the image signal data is inverted by the negative/positive inverter 966, it is possible to sense a transmitted light through a negative film, and the like, convert into signals of a positive image, and output them.

Furthermore, according to the fourth embodiment, since a filter having its transmission peak at the spatial frequency corresponding to 480 TV lines is used, clarity of an image improves.

Fifth Embodiment

The fifth embodiment is a modification of the aforesaid fourth embodiment. A problem which can be overcome in the fifth embodiment will be explained below.

As described above, clarity of an image is improved by processing image signals in the vertical edge enhancing circuit 964 in the fourth embodiment. The edge enhancing process according to the fourth embodiment is effective when displaying an image in non-interlace form, however, there is a bad effect on the image when displaying it in an interlace display system. More specifically, in a case of outputting an image in an interlace display system, such as a television monitor, frequency components near a vertical spatial frequency corresponding to 480 TV lines cause interline flicker, which provides poor viewing of images. Therefore, the frequency components near the vertical spatial frequency corresponding to 480 TV lines have to be sufficiently constrained. Furthermore, when frequency components near a vertical spatial frequency corresponding to 240 TV lines are enhanced, a better result of edge enhancement can be obtained.

As described above, since various output devices can be considered to be connected to an image sensing apparatus using a non-interlace scanning type image sensing device, a vertical edge enhancing circuit is necessarily to have different transmittance characteristics so as to correspond to different output devices.

Further, in the aforesaid fourth embodiment, the negative/positive (N/P) inverter is placed in the downstream of the white balance circuit 965. FIGS. 14A to 14D show relationship between luminance of an object and transmittance of a negative film or video signal levels. As seen especially from FIG. 14C, in a case of performing negative-positive inversion after white balance correction, since the balance of B, G and R signals in bright portion will be lost while the negative-positive inversion, it is necessary to perform white balance correction after the negative-positive inversion. In other words, it is necessary to have two white balance circuits in the up stream and down stream sides of the negative/positive inverter, which results in increasing the size of a circuit configuration. Furthermore, if only one white balance circuit is used as shown in FIG. 8, sufficient adjustment can not be performed.

Furthermore, in a non-interlace scanning type CCD, signals are outputted by two scan lines in parallel so as to reduce energy consumption by decreasing a frequency of a transfer clock. In order to process the signals in parallel, two sets of the same circuits for processing the image signals become necessary, which increase the size of the apparatus. Therefore, in the fourth embodiment, signals are multiplexed in time division by line by using the 1H memories 959 and 960, thereby combining signals of two lines into one line.

However, if the signals are processed in the aforesaid manner, another 1H memories become necessary as shown in FIG. 10, thus the number of storages required in the entire memory increases.

The fifth embodiment is directed to solve the aforesaid problem in the fourth embodiment.

Figure 15:
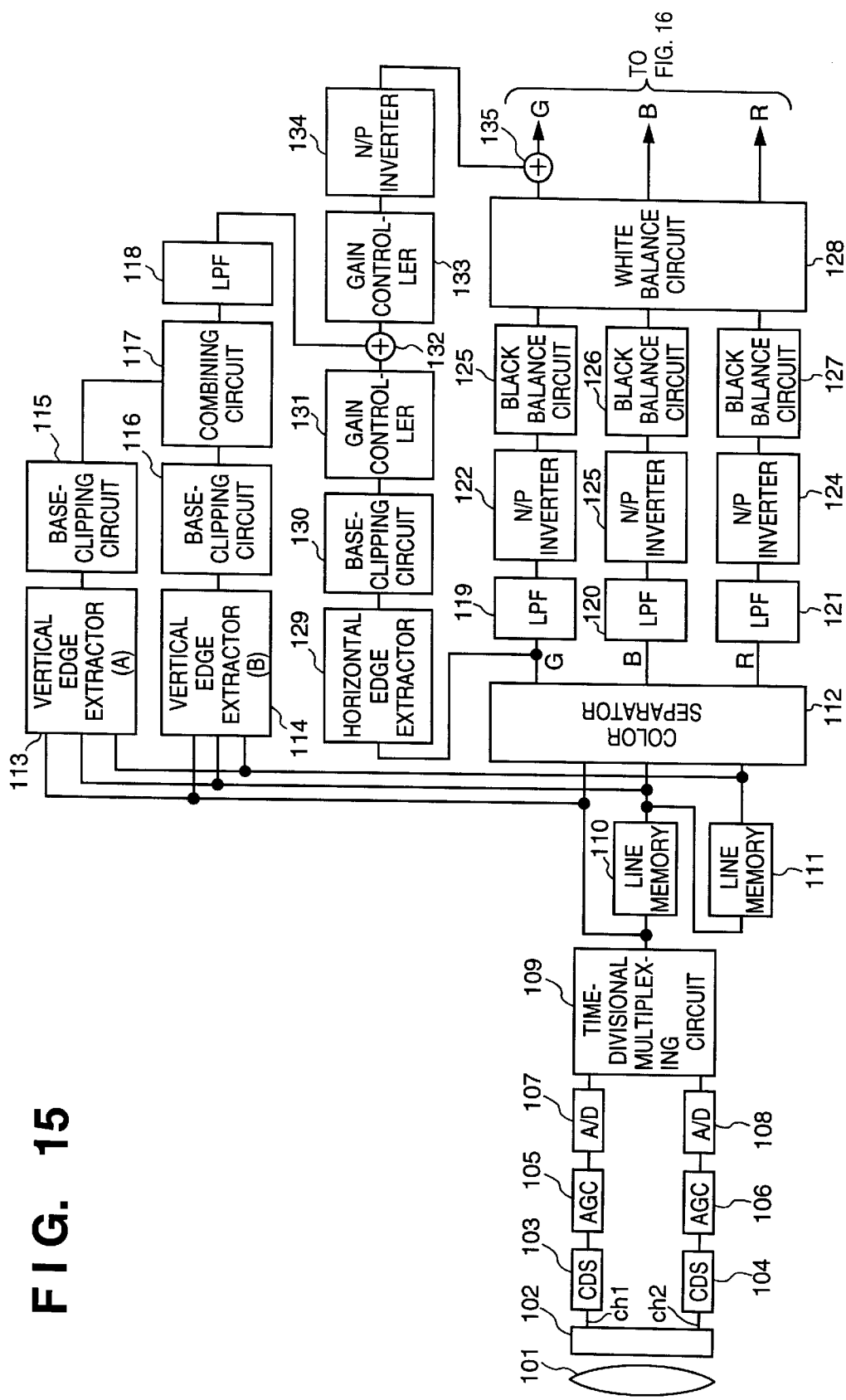
FIG. 15 is a block diagram illustrating a configuration of an image sensing apparatus according to a fifth embodiment.
Figure 16:
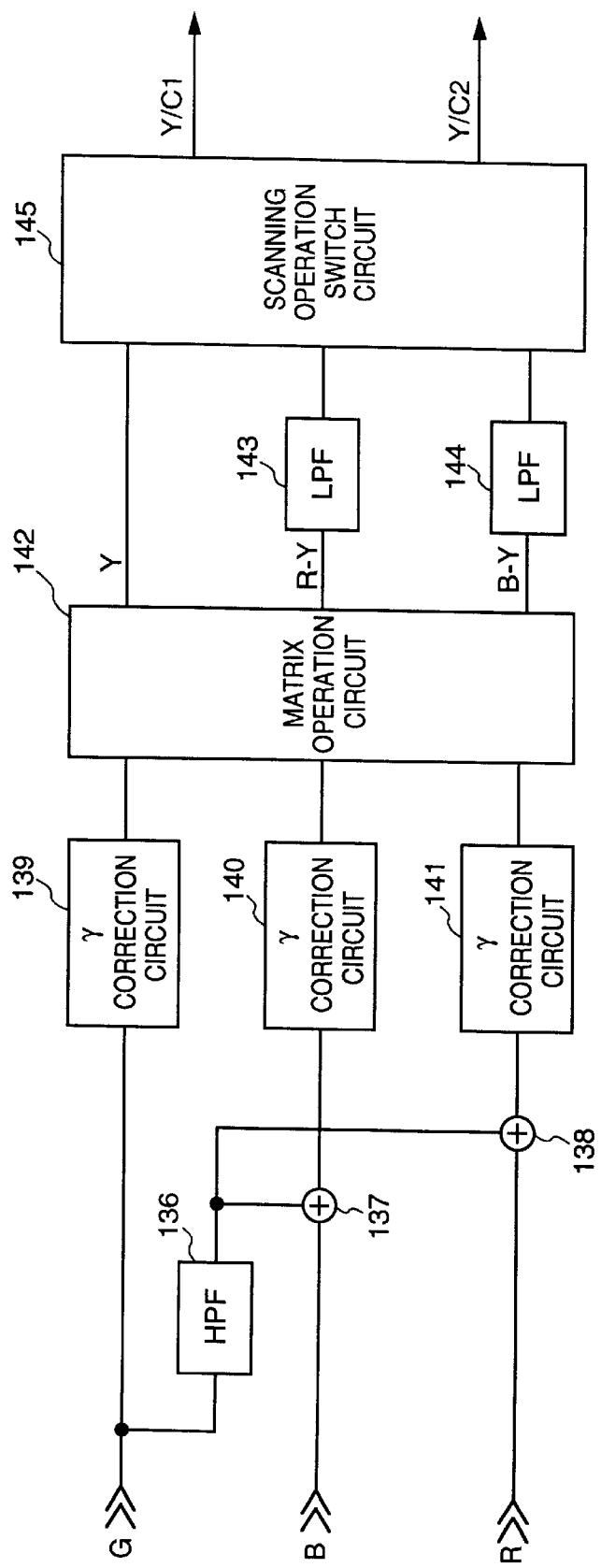
FIG. 16 is a block diagram illustrating a configuration of an image sensing apparatus according to the fifth embodiment.

FIGS. 15 and 16 are block diagrams illustrating a configuration of a video camera to which the present invention is applied. The circuits shown in FIGS. 15 and 16 configures one signal processing circuit when they are connected.

In FIG. 15, reference numeral 101 denotes an optical system for forming an image of an object on an image sensing device; 102, a non-interlace scanning type CCD as a solid-state image sensing device which reads out signals by sequential scanning; 103 and 104, correlated double sampling (CDS) circuits for reducing noises of output signals; 105 and 106, automatic gain controllers (AGC) for amplifying the signals outputted from the CCD 102 to proper levels; 107 and 108, A/D converters for converting the signals outputted from the CCD 102 into digital signals; 109, time-divisional multiplexing circuit for multiplexing signals of two scan lines converted into digital signals by dot in time division; 110 and 111, line memories; 112, color separator for generating G, B and R signals from signals of six scan lines synchronized by the line memories 110 and 111; and 113 and 114, vertical edge extractor for extracting vertical edge signals from the signals of six scan lines synchronized by the line memories 110 and 111.

Further, reference numeral 115 and 116 denote base-clipping circuits for slicing a low amplitude components of the vertical edge signals; 117, a combining circuit for combining the outputs from the base clipping circuits 115 and 116 in an arbitrary ratio; 118, a low-pass filter (LPF) for limiting a frequency range of the vertical edge signal; 119, 120 and 121, low-pass filters for limiting frequency ranges of primary color signals; 122, 123 and 124, negative/positive (N/P) inverters for performing negative-positive inversion; 125, 126 and 127, black balance circuits for adjusting black balance; 128, a white balance circuit for adjusting white balance; 129, a horizontal edge extractor for extracting a horizontal edge signal from a G signal; 130, a base-clipping circuit for slicing low amplitude components of the horizontal edge signal; 131, a gain controller for controlling a gain of the horizontal edge signal; 132, an adder for adding the horizontal edge signal and the vertical edge signal; 133, a gain controller for controlling a gain for the edge signal; 134, a negative/positive (N/P) inverter for performing negative-positive inversion on the edge signal; and 135, an adder for adding the edge signal to the G signal.

Furthermore, in FIG. 16, reference numeral 136 denotes a high-pass filter (HPF) for extracting high frequency components of the G signal; 137 and 138, adders for adding the high frequency components of the G signal extracted by the high-pass filter 136 to the R and B signals; 139, 140 and 141, γ correction circuits; 142, a matrix operation circuit for converting the primary color signals into a luminance signal Y and color difference signals R-Y and B-Y; 143 and 144, low-pass filters (LPF) for limiting frequency ranges of color difference signals; and 145, a scanning operation switch circuit.

Next, an operation of the aforesaid configuration will be described below.

Incoming light reflected by an object passes through the optical system 101 and is formed on the CCD 102 which is a non-interlace scanning type image sensing device, then converted into electrical signals. A color filter is provided on the CCD 102 for sensing a color image. The color filter array has color filter chips arranged in so-called Bayer arrangement as shown in FIG. 23.

The converted electronic signals are outputted from two output terminals (channel ch1 and ch2) of the CCD 102 by two scan lines in parallel. More specifically, signals in odd scan lines are outputted from one terminal, and signals in even scan lines are outputted from the other terminal.

Signals outputted from the channels ch1 and ch2 of the CCD 102 are respectively processed by the CDS circuits 103 and 104 and the AGCs 105 and 106, then converted into digital signals by the A/D converters 107 and 108. The signals outputted from the A/D converters 107 and 108 are multiplexed in time division by the time-divisional multiplexing circuit 109 in accordance with timing signals generated by a timing signal generator (not shown). At this time, the sampling frequency of the time-divisional multiplexed signal are two times higher than the sampling frequency of the CCD 102. FIGS. 17A to 17C show operational timing of the time-divisional multiplexing circuit 109. As especially shown in FIG. 17C, the signals of odd scan lines and the signals of even scan lines are multiplexed in each clock.

The signals of two scan lines multiplexed in time-division by the time-divisional multiplexing circuit 109 are synchronized with signals of four other scan lines by the line memories 110 and 111 to form signals of six scan lines. FIGS. 18A to 18D show operational timing of the line memories.

Figure 19A:
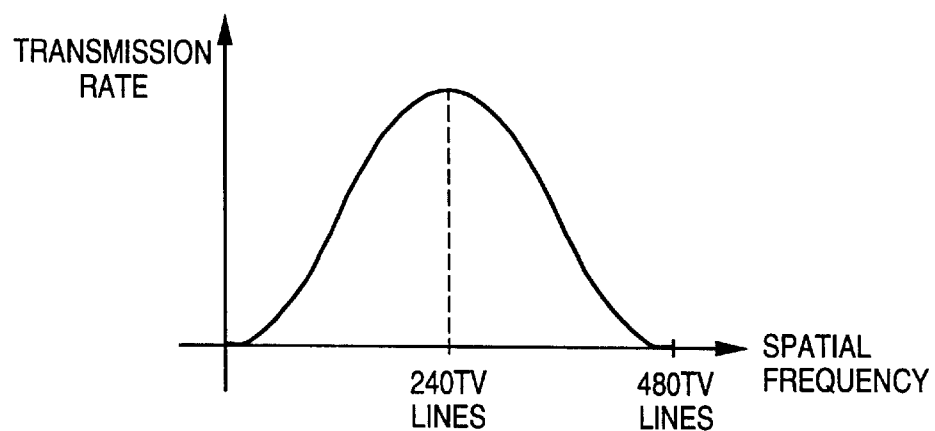
FIGS. 19A and 19B are graphs showing transmission characteristics of vertical edge extractors.
Figure 19B:
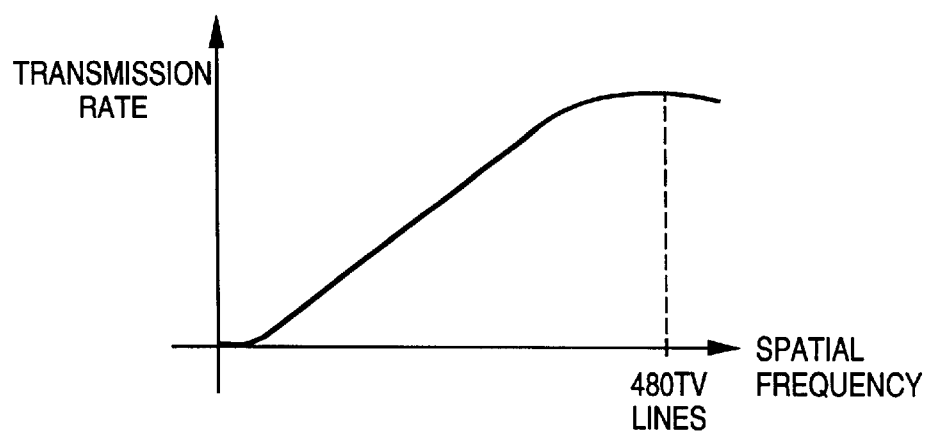
Figure 19C:
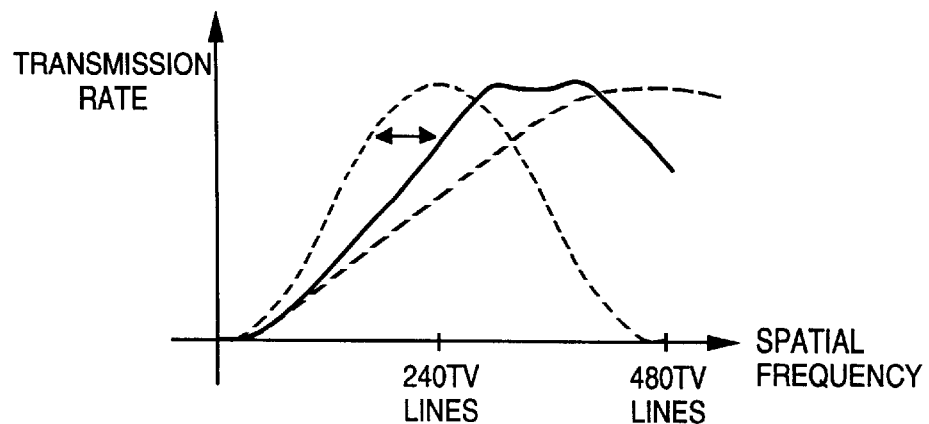
FIG. 19C is a graph for explaining operation of a combining circuit.

The signals of the six scan lines are inputted into the vertical edge extractors 113 and 114 where vertical edge signals are extracted. Each of the vertical edge extractors 113 and 114 comprises a high-pass filter in the vertical direction. In a case where the CCD 102 has 640×480 pixels, the high pass filters respectively have the transmission characteristics as shown in FIGS. 19A and 19B. The vertical edge signals extracted by the vertical edge extractors 113 and 114 are inputted to the base clipping circuits 115 and 116 where the low amplitude components are sliced for reducing noises. Thereafter, the vertical edge signals are combined in an arbitrary ratio. By changing the combining ratio, it is possible to continuously change the frequency characteristics of the combined vertical edge signal as shown in FIG. 19C, thereby it becomes possible to obtain image quality suitable for a device which outputs the image.

Unnecessary frequency range in the horizontal direction is removed from the combined vertical edge signal by the low-pass filter 118.

Meanwhile, the signals of six scan lines are separated into G, B and R signals in accordance with timing signals from a timing signal generator (not shown). The G, B and R signals are also in a form that signals of two scan lines are multiplexed in time division.

The separated G signal is inputted to the horizontal edge extractor 129 where a horizontal edge signal is extracted. The extracted horizontal edge signal is processed by the base clipping circuit 130 and the gain controller 131, then added to the aforesaid vertical edge signal by the adder 132. The added edge signal is adjusted to a proper signal level by the gain controller 133, then further added to the G signal by the adder 135.

Low frequency components of the separated G, B and R signals are respectively extracted by the low-pass filters 119, 120 and 121.

In this embodiment, since the sampling points of G signal exist in every line as shown in FIG. 23, the frequency range of the spatial frequency of the G signal in the horizontal direction is from ½ of the horizontal sampling frequency of the CCD 102 and less. Therefore, the transmission range of the low-pass filter 120 is set to the frequency which is about ½ of the sampling frequency of the CCD 102 and less. Further, the sampling points of R and B signals exist in every other lines, thus the frequency ranges of the spatial frequencies of the R and B signals are ½ of the spatial frequency of the G signal. Accordingly, the transmission range of the low-pass filters 121 and 122 are set to the frequency which is about ¼ of the sampling frequency of the CCD 102 and less.

Figure 20B:
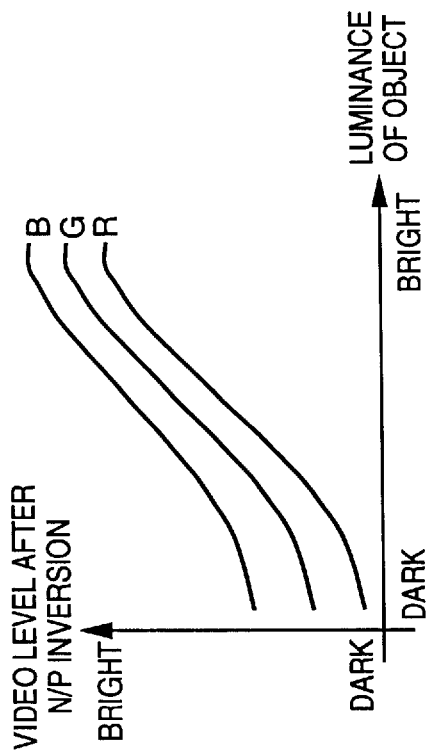
FIGS. 20A to 20D are graphs showing video signal levels at each processes when taking an image from a negative film.
Figure 20D:
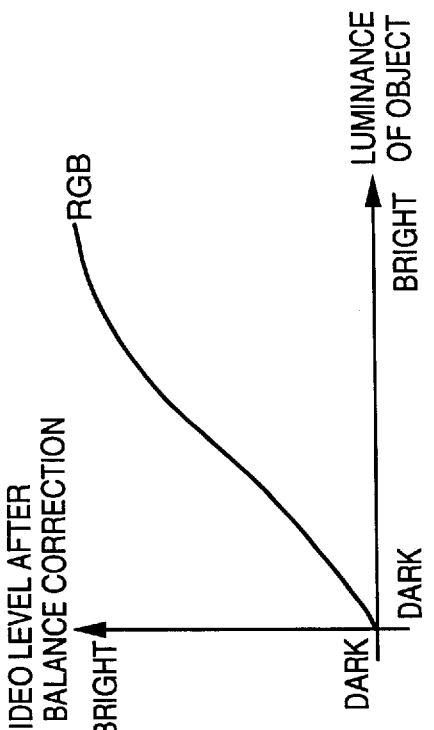
Figure 20A:
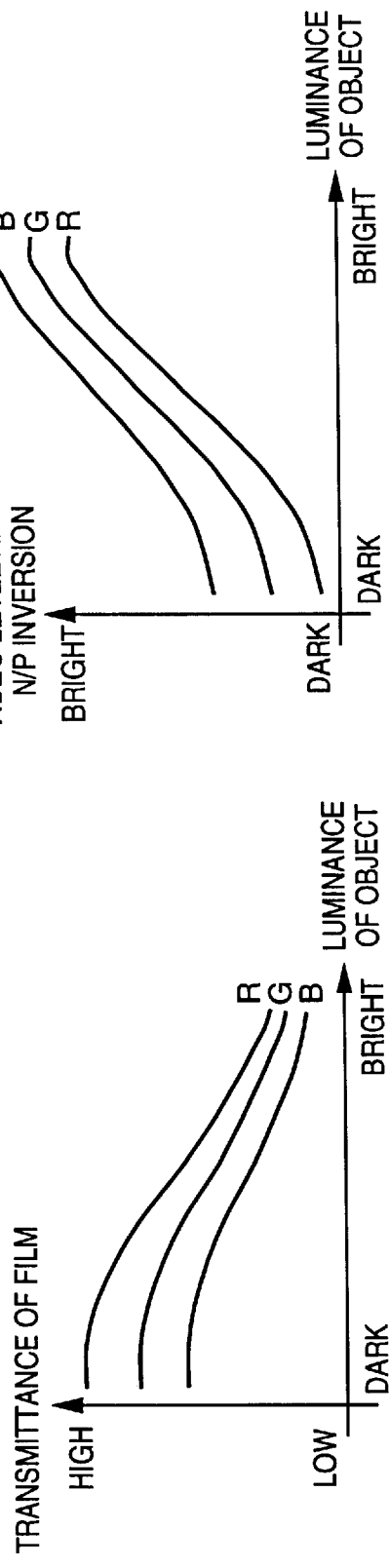
Figure 20C:
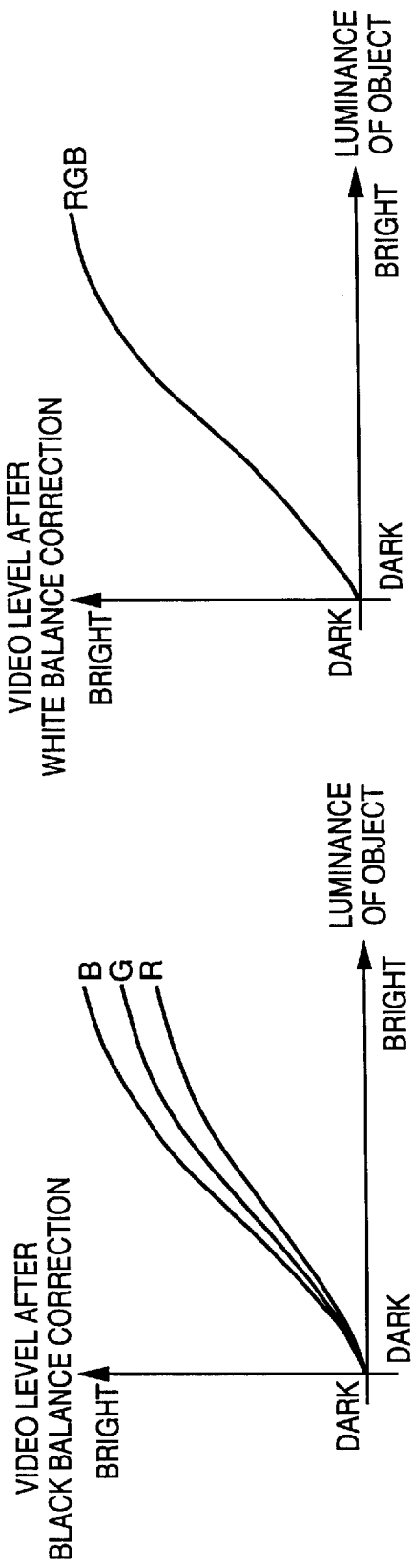
Figure 22:
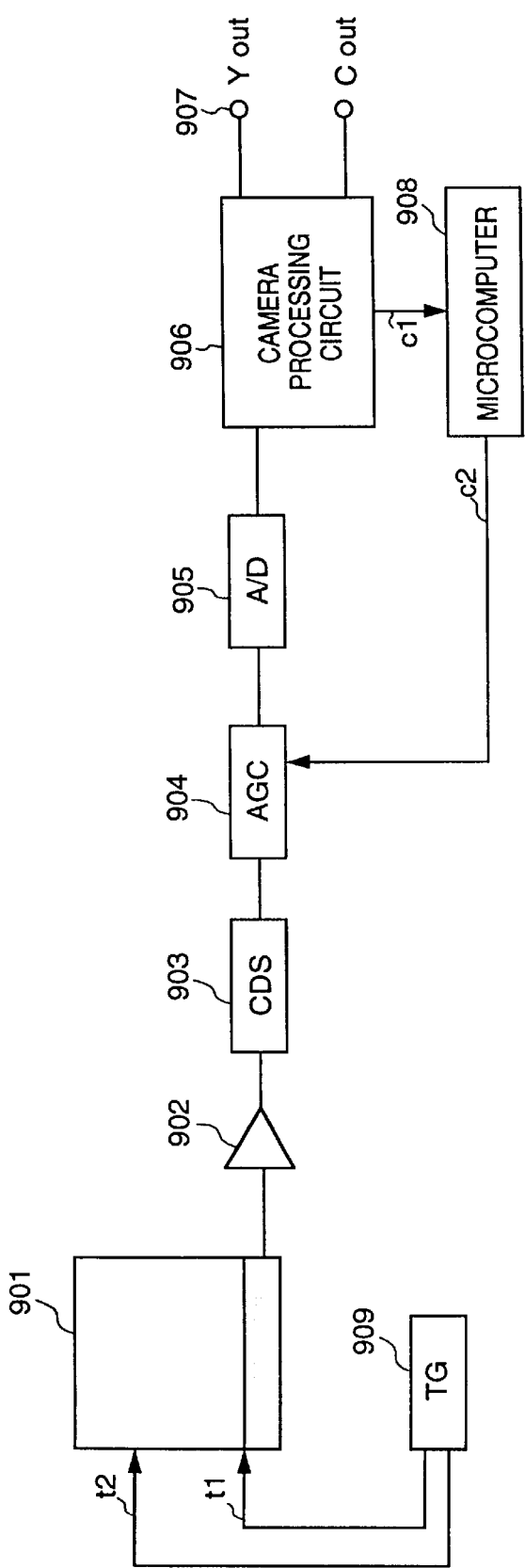
FIG. 22 is a block diagram illustrating a configuration of a common image sensing apparatus which outputs image signals after adding signals of adjacent two vertical pixels.

The primary color signals whose frequency ranges are limited are applied with negative-positive inversion by the negative/positive inverters 122, 123 and 124 if the object is a negative image. In the negative/positive inverters 122, 123 and 124, brightness and darkness of the signals are inverted. In a normal negative film, the transmittance of film with respect to luminous exposure depends upon G, B and R colors as shown in FIG. 20A. Therefore, when such the G, B and R signals are performed with negative-positive inversion, the levels of G, B and R video signals also vary as shown in FIG. 20B. To solve this problem, the levels of G, B and R signals at a black position are adjusted by the black balance circuits 125, 126 and 127 after the negative-positive inversion. The relationship between the luminance signal of the object and the video signal levels is shown in FIG. 20C. Thereafter, gains for R and B signals are changed by the white balance circuit 128 to match the levels of the G, B and R signals at a white portion. The relationship between the luminance of the object and the video signal levels at this time is shown in FIG. 20D.

Figure 28:
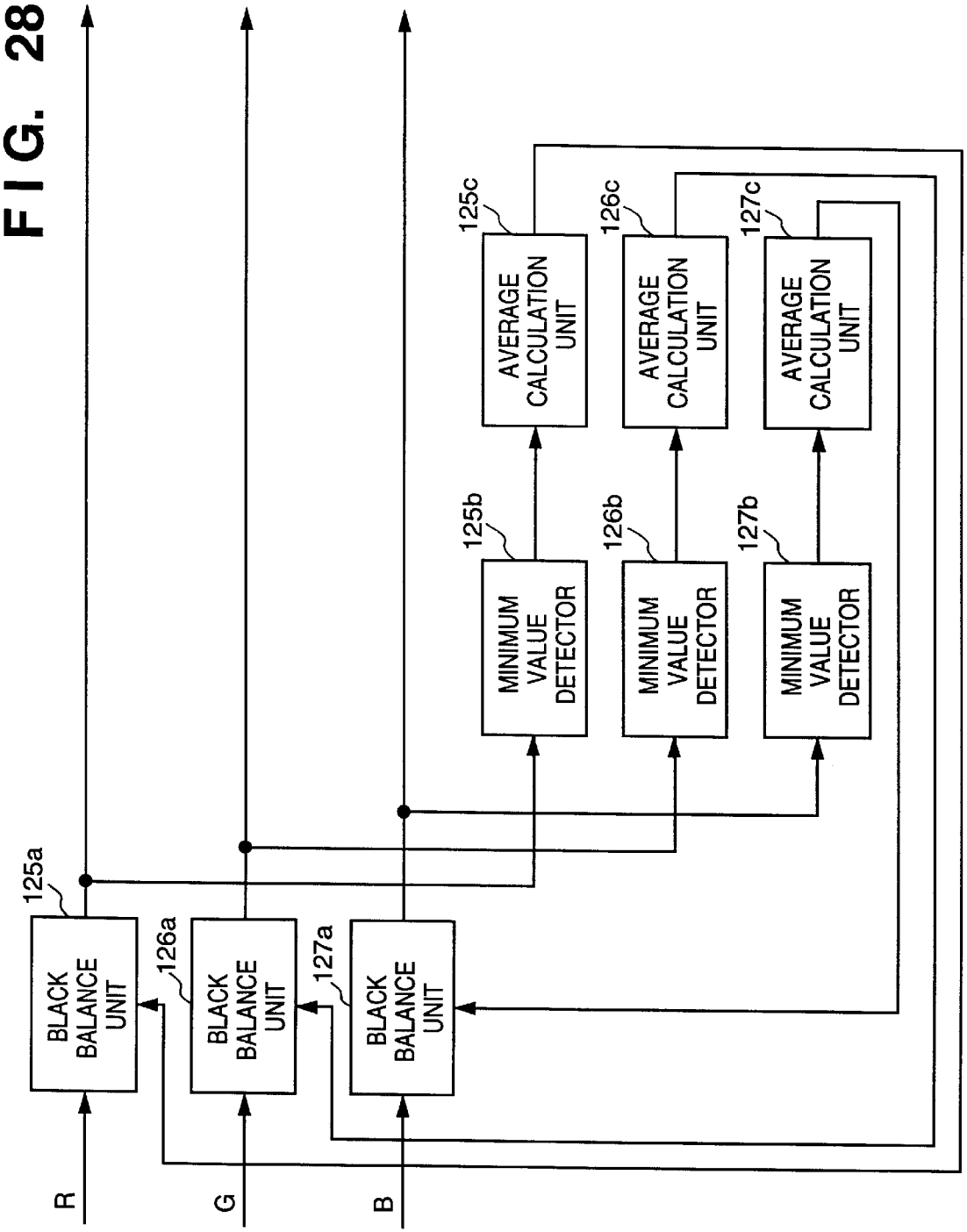
FIG. 28 is a block diagram showing a detailed configuration of the black balance circuits according to the fifth embodiment.

FIG. 28 is a block diagram showing a detailed configuration of the black balance circuits 125 to 127 according to the fifth embodiment. In FIG. 28, reference numerals 125a to 127a denote black balance units which adjust a black portion on the basis of black reference values outputted from average calculation units 125c to 127c which will be explained later. More specifically, by subtracting black reference values from input data, the black portion in an image is represented by "0" data.

Reference numerals 125b to 127b denote minimum value detectors each which detects a minimum value for each small area obtained by dividing a frame into n areas and outputs the minimum value. Therefore, n values relating to R data are obtained from the minimum value detector 125b, n values relating to G data are obtained from the minimum value detector 126b, and n values relating to B data are obtained from the minimum value detector 127b. The average calculation units 125c to 127c calculate averages of the input n values, and outputs the averages as the black reference values. For example, an average of input n values is calculated by the average calculation unit 125c and inputted to the black balance unit 125a as a black reference value for R data. The same operation is performed in the average calculation units 126c and 127c, and black reference values for G data and for B data are outputted.

Note, in a case where the minimum values of the n values input to the average calculation units 125c to 127c are greater than a predetermined value, predetermined black reference values are outputted on the assumption that there is no black portion in an image. It is possible to use predetermined black values for all of the R, G and B data if any one of the minimum values of n values for R, G and B data is greater than a predetermined value. In this case, it is necessary to inform each of the average calculation units 125c to 127c as to whether or not the predetermined black reference values are used.

It should be noted that all or a part of the functions of the black balance units 125a to 127a, the minimum value detectors 125b to 127b, and the average calculation units 125c to 127c can be performed by software by a microcomputer provided in the image sensing apparatus. Further, the average of the n values is used for conjecturing a black portion in an image in the aforesaid configuration, it is possible to use other method.

With these processes, the tone and hue of an image of an object formed on a negative film are reproduced as complete video signals. Further, the negative-positive inversion is also applied to the edge signal by the negative/positive inverter 134.

Next, in FIG. 16, high frequency components of the G signal are extracted by the high-pass filter 136, and added to the B and R signals by the adders 137 and 138, respectively. The transmission characteristics of the high-pass filter 136 are complementary to the low-pass filters 120 and 121 so that all of the G, B and R signals have the same spatial frequency range.

Thereafter, the R, B and G signals are applied with γ correction by the γ correction circuits 139, 140 and 141, then converted into luminance signal Y and color difference signals R-Y and B-Y. The bandwidth of the color difference signals R-Y and B-Y is limited to about ½ of the bandwidth of the luminance signal Y by the low-pass filters 143 and 144.

Lastly, the luminance signal Y and the color difference signals R-Y and B-Y are inputted to the scanning operation switch circuit 145. The scanning operation switch circuit 145 switches the input Y, R-Y and B-Y signals in accordance with a switch pulse generated by a timing signal generator (not shown), and generates video signals of two lines which are respectively obtained by multiplexing Y, R-Y and B-Y signals of each scan line in time division. For example, for Y signals of two pixels, R-Y signal of one pixel and B-Y signal of one pixel are selected, and these signals are multiplexed in the order of Y, R-Y, Y, B-Y, and so on, in time division. It should be noted that the Y, R-Y and B-Y signals to be multiplexed have to be in the same scan line. Timing of this operation is shown in FIGS. 21A to 21G. At this time, the time interval between clocks for output signal is two times longer than that of the sampling rate of Y signal.

As for the luminance signal outputted from the matrix operation circuit 142, luminance signals of two scan lines are multiplexed by pixel in time division by the matrix operation circuit 142 and inputted to the scanning operation switch circuit 145. Similarly, the color difference signals R-Y and B-Y inputted to the scanning operation switch circuit 145 from the matrix operation circuit 142 through the LPFs 143 and 144 are also multiplexed signals of color difference signals of two scan lines in time division as shown in FIGS. 21B and 21C. The scanning operation switch circuit 145 obtains two lines of video signals on the basis of the input multiplexed luminance signal Y and the input multiplexed color difference signals R-Y and B-Y. Here, the video signal of each line is a time-divisionally multiplexed video signal as shown in FIGS. 21D and 21E. Therefore, as shown in FIGS. 21F and 21G, signals of odd scan lines are outputted from a Y/C1 terminal and signals of even scan lines are outputted from a Y/C2 terminal in a given field period. Accordingly, it is possible to display an image in non-interlace by using the signals outputted from both of the Y/C1 and Y/C2 terminals. Further, as shown in FIGS. 21F and 21G, a signal of odd scan lines or even scan lines is alternatively outputted from the Y/C1 and Y/C2 terminals. Thus, a signal suitable for an interlace display can be obtained by using the signal output from either the Y/C1 terminal or the Y/C2 terminal. In other words, when the signal from one of the two output terminals is used, then the obtained signal corresponds to an interlaced signal, and when the signals from both of the two output terminals are used, then the obtained signal corresponds to a non-interlace signal.

As described above, by processing signals of two scan lines dot sequentially, it is possible to reduce storages used in the entire signal processing circuit comparing to the apparatus described in the fourth embodiment. Accordingly, it is possible to configure an apparatus having a smaller circuit configuration which consumes less electrical energy. Further, it is another advantage in that a circuit configuration for switching scanning operation can be also reduced.

Further according to the fifth embodiment as described above, by combining vertical edge signals generated by a plurality of vertical edge extractor (113 and 114) having different transmission characteristics in an arbitrary ratio, it is possible to continuously change the frequency characteristics of the combined vertical edge signal, thereby obtaining image quality suitable for a device which outputs the image.

Furthermore, according to the fifth embodiment, the level of each color signal at a black portion is adjusted by the black balance circuit after negative-positive inversion, then the level of each color signal at a white portion is adjusted by changing gains for each color signal by the white balance circuit. As a result, it is possible to completely reproduce the tone and hue of an image formed on a negative film as video signals with a simple circuit configuration.

Furthermore, according to the fifth embodiment, by multiplexing signals of two scan lines by pixel in time division by a time-divisional multiplexing circuit, switching of scanning operation corresponding to interlace scanning can be realized with a simple circuit configuration.

The present invention is not limited to the above embodiments and various changes and modifications can be made within the spirit and scope of the present invention. Therefore to appraise the public of the scope of the present invention, the following claims are made.

What is claimed is:

1. An image sensing apparatus comprising:

readout unit having a first output amplifier for outputting a first signal of a first scan line and a second output amplifier for outputting a second signal of a second scan line in parallel, from an image pickup unit, wherein said first and second output amplifiers have different gain characteristics;

generation unit for generating a plurality of component signals for forming image signals from the signals of the plurality of scan lines; and a filter which removes noise frequency components, caused by gain difference between said first and second amplifiers, contained in said component signals by removing at least one of predetermined frequency components in the horizontal, vertical, and oblique directions from at least one of the plurality of component signals generated by said generation unit.

2. The image sensing apparatus according to claim 1 further comprising image signal output unit for generating image signals to be outputted on the basis of the plurality of component signals generated by said generation unit and the component signal processed by said filter and outputting the image signals.

3. The image sensing apparatus according to claim 1, wherein said filter removes Nyquist frequency components in the horizontal, vertical and oblique directions from at least one of the plurality of component signals.

4. The image sensing apparatus according to claim 1, wherein said filter includes:

first filter unit removing predetermined frequency components in the vertical and oblique directions from at least one of the plurality of component signals; and second filter unit for removing predetermined frequency components in the horizontal direction from the component signal processed by said first filter unit.

5. The image sensing apparatus according to claim 4, wherein said first filter unit removes Nyquist frequency components in the vertical and oblique directions from at least one of the plurality of component signals and said second filter unit removes a Nyquist frequency component in the horizontal direction from the component signal processed by said first filter unit.

6. The image sensing apparatus according to claim 1, wherein said first and second scan lines are adjacent to one another.

7. The image sensing apparatus according to claim 1, wherein a color filter is provided on an image sensing surface of the image pickup unit, and with the color filter, pixels for obtaining green color information are arranged in a check pattern, and pixels for obtaining red and blue color information are arranged between the pixels for obtaining the green color information.

8. The image sensing apparatus according to claim 7, wherein the plurality of component signals generated by said generation unit includes luminance component signal generated by extracting signals corresponding to the pixels for obtaining the green color information, and said color filter removes at least one of the predetermined frequency components in the horizontal, vertical or oblique direction from the luminance component signal.

9. The image sensing apparatus according to claim 8, wherein said generation unit extracts signals corresponding to the pixels for obtaining green color information, interpolates zero to the pixels which are between the pixels for obtaining the green color components, and generates the luminance component signal.

10. The image sensing apparatus according to claim 1, wherein said filter is a two-dimensional filter coefficient matrix to be applied to a plurality of pixels, and a sum of filter coefficients at positions in a check pattern in the filter coefficient matrix is equal to a sum of the remaining filter coefficients.

11. The image sensing apparatus according to claim 4, wherein said first filter unit is a two-dimensional filter coefficient matrix to be applied to a plurality of pixels, and a sum of filter coefficients at positions in a check pattern in the filter coefficient matrix is equal to a sum of the remaining filter coefficients.

12. An image signal controller which generates image signals on the basis of signals inputted from image pickup unit, said controller comprising:

readout unit having a first output amplifier for outputting a first signal of a first scan line and a second output amplifier for outputting a second signal of a second scan line in parallel, from the image pickup unit, wherein said first and second output amplifiers have different gain characteristics;

generation unit for generating a plurality of component signals for forming the image signals from the signals of the plurality of scan lines;

a filter which removes noise frequency components, caused by gain difference between said first and second amplifiers, contained in said component signals by removing at least one of predetermined frequency components in the horizontal, vertical, and oblique directs from at least one of the plurality of component signals generated by said generation unit; and output unit for generating the image signals on the basis of the plurality of component signals generated by said generation unit and the component signals processed by said filer and outputting the image signals.

13. A control method of controlling an image sensing controller which generates image signals on the basis of signals inputted from an image pickup unit, said method comprising:

a readout step of outputting a first signal of a first scan line through a first output amplifier and a second signal of a second scan line through a second output amplifier in parallel, from the image pickup unit, wherein said first and second output amplifiers have different gain characteristics;

a generating step of generating a plurality of component signals for forming the image signals from the signals of the plurality of scan lines; and a filtering step of removing noise frequency components, caused by gain difference between said first and second amplifiers, contained in said component signals by removing at least one of predetermined frequency components in the horizontal, vertical, and oblique directions from at least one of the plurality of component signals generated at said generating step; and an output step of generating the image signals on the basis of the plurality of component signals generated at said generating step and the component signal processed at said filtering step and outputting the image signals.

14. An image sensing apparatus comprising:

image sensing unit having a first and a second readout channels, wherein said first readout channel includes a first output amplifier and said second readout channel includes a second output amplifier whose gain is different from gain of said first amplifier;

combining unit for combining output signals from said first and second amplifiers to produce a combined signal; and a filter which removes noise frequency components caused by said gain difference between said first and second amplifiers from said combined signal.

15. The image sensing apparatus according to claim 14, wherein said filter removes predetermined frequency components in the vertical direction from the output signals.

16. The image sensing apparatus according to claim 15, wherein said filter removes predetermined frequency components in the horizontal direction from the output signals.

17. The image sensing apparatus according to claim 16, wherein said filter removes predetermined frequency components in the oblique direction from the output signals.

18. The image sensing apparatus according to claim 14, wherein said first and second readout channels are for reading signals of a plurality of lines of said images sensing unit at the same time.

* * * * *

UNITED STATES PATENT AND TRADEMARK OFFICE
CERTIFICATE OF CORRECTION

PATENT NO. : 6,690,418 B1
DATED : February 10, 2004
INVENTOR(S) : Ken Terasawa et al.

It is certified that error appears in the above-identified patent and that said Letters Patent is hereby corrected as shown below:

<u>Title page,</u>
Insert Item:
-- [63] Continuation of application serial no. 08/771,399 filed December 19, 1996 --

<u>Column 8,</u>
Line 13, please delete "α" and substitute therefore -- O --

Signed and Sealed this

Tenth Day of August, 2004

JON W. DUDAS
*Acting Director of the United States Patent and Trademark Office*